US007684625B2

(12) United States Patent
Hyoki

(10) Patent No.: US 7,684,625 B2
(45) Date of Patent: Mar. 23, 2010

(54) IMAGE PROCESSING APPARATUS, IMAGE PROCESSING METHOD, IMAGE PROCESSING PROGRAM, PRINTED MATTER INSPECTION APPARATUS, PRINTED MATTER INSPECTION METHOD AND PRINTED MATTER INSPECTION PROGRAM

(75) Inventor: Kenji Hyoki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1129 days.

(21) Appl. No.: 10/704,570

(22) Filed: Nov. 12, 2003

(65) Prior Publication Data

US 2004/0146202 A1 Jul. 29, 2004

(30) Foreign Application Priority Data

Dec. 20, 2002 (JP) ............................. 2002-369326

(51) Int. Cl.
G06K 9/68 (2006.01)
G06K 9/62 (2006.01)
H04N 1/409 (2006.01)
H04N 1/407 (2006.01)
G06F 15/00 (2006.01)
G06K 9/00 (2006.01)

(52) U.S. Cl. .................... 382/217; 382/209; 382/112; 358/3.26; 358/1.2

(58) Field of Classification Search ................ 382/112, 382/209, 217; 358/1.2, 3.26
See application file for complete search history.

(56) References Cited

U.S. PATENT DOCUMENTS 4,025,898 A * 5/1977 Shaw ......................... 382/124
4,493,105 A * 1/1985 Beall et al. .................. 382/197
4,595,954 A * 6/1986 Endo et al. ................ 348/219.1
5,067,166 A * 11/1991 Ito ............................. 382/215

(Continued)

FOREIGN PATENT DOCUMENTS

JP    A-61-52783    3/1986

(Continued)

OTHER PUBLICATIONS

"Knowledge-Based Partial Matching: An Efficient Form Classification Method", Byun et al. Sep. 7-8, 2001, GREX 2002, LNCS 2390, Springer-Verlag Berlin Heidelberg 2002.*

(Continued)

*Primary Examiner*—Bhavesh M Mehta
*Assistant Examiner*—Mia M Thomas
(74) *Attorney, Agent, or Firm*—Oliff & Berridge, PLC

(57) ABSTRACT

A split image generation portion generates split images. A split projected waveform generation portion generates split projected waveforms from the split images respectively. A projected waveform synthesizer portion generates projected waveforms by combining the split projected waveforms. A feature volume extraction portion extracts feature volumes from the generated projected waveforms. A feature volume correlation portion correlates feature volume data of a target image with feature volume data of a reference image. A correction value calculation portion calculates correction values in accordance with geometrical distortion between the reference image and the target image on the basis of a result of the correlation and generates an n-dimensional lookup table. An image collation portion collates the target image with the reference image in consideration of the geometrical distortion by using the lookup table.

27 Claims, 27 Drawing Sheets

U.S. PATENT DOCUMENTS

| | | | | |
|---|---|---|---|---|
| 5,367,212 | A * | 11/1994 | Rabii | 327/105 |
| 5,432,548 | A * | 7/1995 | Byen et al. | 348/180 |
| 5,506,793 | A | 4/1996 | Straayer et al. | |
| 5,608,404 | A * | 3/1997 | Burns et al. | 342/25 A |
| 5,719,967 | A * | 2/1998 | Sekine | 382/266 |
| 5,809,171 | A * | 9/1998 | Neff et al. | 382/209 |
| 5,825,924 | A * | 10/1998 | Kobayashi | 382/219 |
| 5,883,971 | A * | 3/1999 | Bolle et al. | 382/124 |
| 5,890,808 | A * | 4/1999 | Neff et al. | 382/209 |
| 5,912,987 | A * | 6/1999 | Hashiya | 382/162 |
| 5,982,930 | A * | 11/1999 | Neff et al. | 382/209 |
| 6,031,942 | A * | 2/2000 | Nakayama | 382/284 |
| 6,049,621 | A * | 4/2000 | Jain et al. | 382/125 |
| 6,215,527 | B1 * | 4/2001 | Okamoto et al. | 348/625 |
| 6,272,246 | B1 * | 8/2001 | Takai | 382/209 |
| 6,295,374 | B1 * | 9/2001 | Robinson et al. | 382/218 |
| 6,431,676 | B2 * | 8/2002 | Asauchi et al. | 347/10 |
| 6,466,686 | B2 * | 10/2002 | Senior | 382/124 |
| 6,477,275 | B1 * | 11/2002 | Melikian et al. | 382/217 |
| 6,501,856 | B2 * | 12/2002 | Kuwano et al. | 382/194 |
| 6,537,680 | B1 | 3/2003 | Norlander et al. | |
| 6,574,573 | B1 * | 6/2003 | Asano | 702/76 |
| 6,598,480 | B2 * | 7/2003 | Horiuchi et al. | 73/663 |
| 6,658,145 | B1 * | 12/2003 | Silver et al. | 382/149 |
| 6,690,841 | B2 * | 2/2004 | Nguyen et al. | 382/294 |
| 6,741,742 | B1 * | 5/2004 | Hagiwara | 382/209 |
| 6,807,304 | B2 * | 10/2004 | Loce et al. | 382/209 |
| 6,825,931 | B2 * | 11/2004 | Welchman et al. | 356/394 |
| 6,839,144 | B2 * | 1/2005 | Okada et al. | 356/606 |
| 6,941,083 | B1 * | 9/2005 | Muratani | 399/49 |
| 6,944,341 | B2 * | 9/2005 | Loce et al. | 382/209 |
| 6,950,548 | B1 * | 9/2005 | Bachelder et al. | 382/145 |
| 6,961,468 | B2 * | 11/2005 | Huang et al. | 382/218 |
| 7,010,166 | B2 * | 3/2006 | Ayshi et al. | 382/199 |
| 7,039,233 | B2 * | 5/2006 | Mori et al. | 382/181 |
| 7,058,223 | B2 * | 6/2006 | Cox | 382/190 |
| 7,076,101 | B2 * | 7/2006 | Chung et al. | 382/218 |
| 7,079,689 | B2 * | 7/2006 | Fukuda | 382/191 |
| 7,079,979 | B2 * | 7/2006 | Fukui | 702/182 |
| 7,185,914 | B2 * | 3/2007 | Recker et al. | 280/730.2 |
| 7,201,459 | B1 * | 4/2007 | Sano et al. | 347/10 |
| 7,213,898 | B2 * | 5/2007 | Hara | 347/15 |
| 7,227,973 | B2 * | 6/2007 | Ishiyama | 382/103 |
| 7,269,287 | B2 * | 9/2007 | Shishido et al. | 382/207 |
| 7,302,111 | B2 * | 11/2007 | Olsson et al. | 382/266 |
| 7,363,070 | B2 * | 4/2008 | Ogata et al. | 600/409 |
| 7,430,319 | B2 * | 9/2008 | Hyoki et al. | 382/168 |
| 7,463,763 | B2 * | 12/2008 | Sano et al. | 382/144 |
| 2002/0039446 | A1 * | 4/2002 | Santoni | 382/209 |
| 2002/0077537 | A1 * | 6/2002 | Avrin et al. | 600/409 |
| 2002/0115925 | A1 * | 8/2002 | Avrin et al. | 600/407 |
| 2003/0185462 | A1 * | 10/2003 | Hsieh | 382/286 |
| 2004/0036924 | A1 * | 2/2004 | Ihara | 358/3.28 |
| 2004/0037451 | A1 * | 2/2004 | Kim et al. | 382/113 |
| 2004/0085761 | A1 * | 5/2004 | Offiler et al. | 362/217 |
| 2004/0120579 | A1 * | 6/2004 | Cemic et al. | 382/209 |
| 2006/0171593 | A1 * | 8/2006 | Hayakawa et al. | 382/209 |
| 2007/0025628 | A1 * | 2/2007 | Sekiguchi et al. | 382/239 |
| 2007/0071359 | A1 * | 3/2007 | Yumoto et al. | 382/284 |

FOREIGN PATENT DOCUMENTS

| | | |
|---|---|---|
| JP | A-2-19984 | 1/1990 |
| JP | A-6-4660 | 1/1994 |
| JP | A-6-195462 | 7/1994 |
| JP | A 07-57085 | 3/1995 |
| JP | A-7-249122 | 9/1995 |
| JP | A 08-35936 | 2/1996 |
| JP | B2-2733206 | 3/1998 |
| JP | A 11-194154 | 7/1999 |
| JP | B2 3140838 | 12/2000 |
| JP | A-2001-266144 | 9/2001 |
| JP | A 2002-181732 | 6/2002 |

OTHER PUBLICATIONS

"Form Classification using DP Matching", Byun et al. Mar. 19-21, 2000, ACM-Como, Italy, pp. 1-4.*

Answers.com—Definition (Geometrical Distortion), p. 1 of 1.*

Eadie et al. "Correction of Geometric Image Distortion using FPGA's" Department of Computer Science—pp. 1 of 10.*

Ivannikov et al. "Checking Geometrical Distortion and Data Loss in Optoelectronic Conversion in an Image Input"—pp. 1 of 4.*

Torres et al. "A Practical Algorithm to Correct Geometrical Distortion of Image Acquisition Cameras" 2004 International conf in Image processing, pp. 2451-2455.*

* cited by examiner

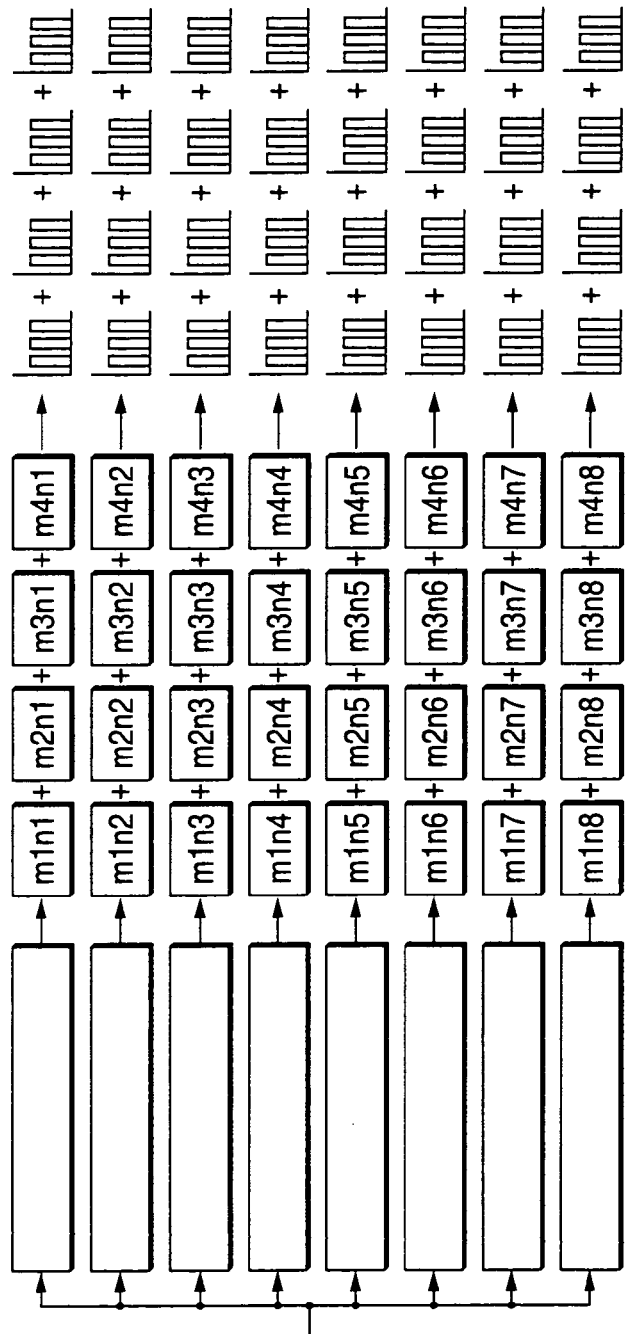

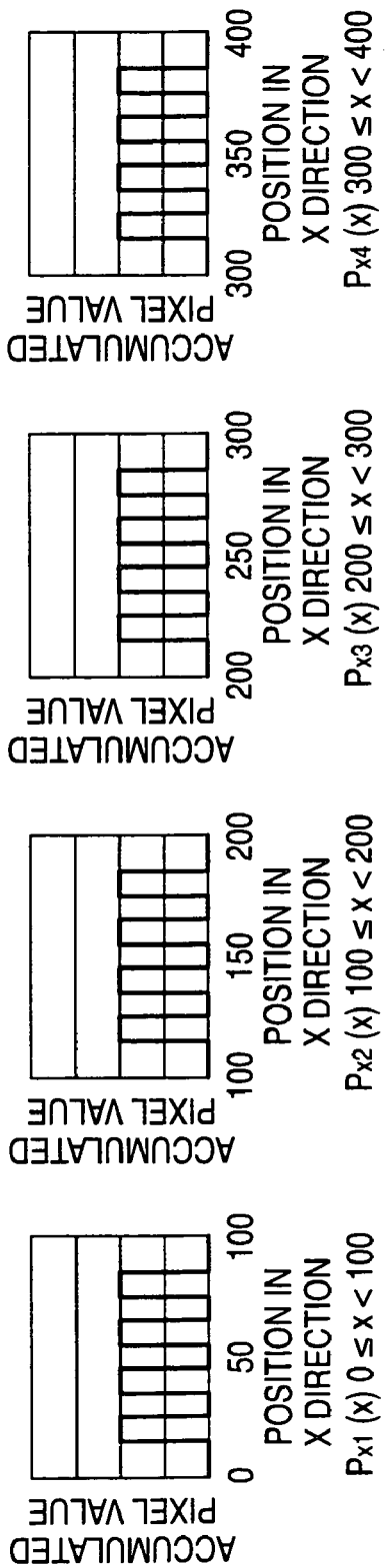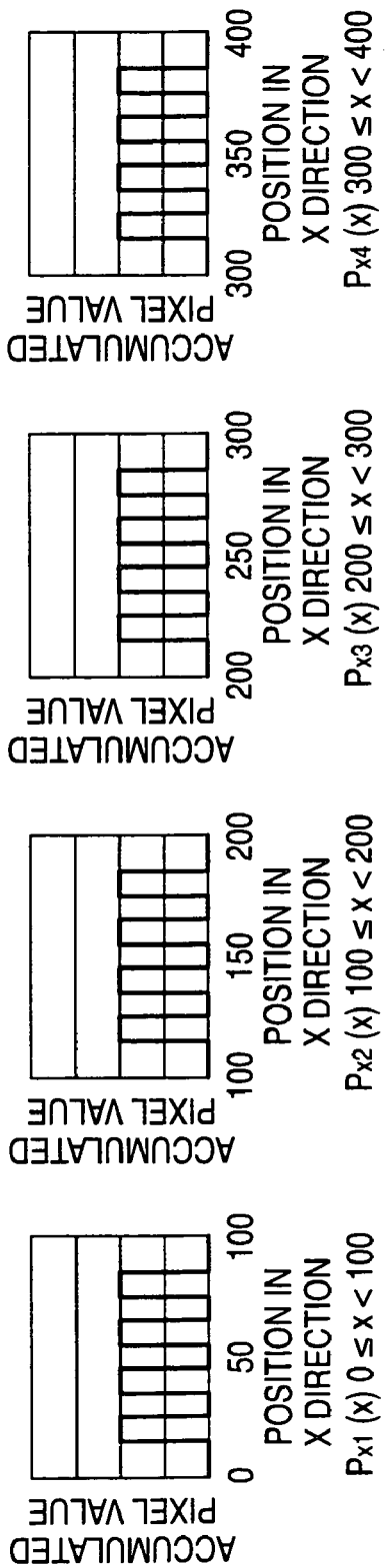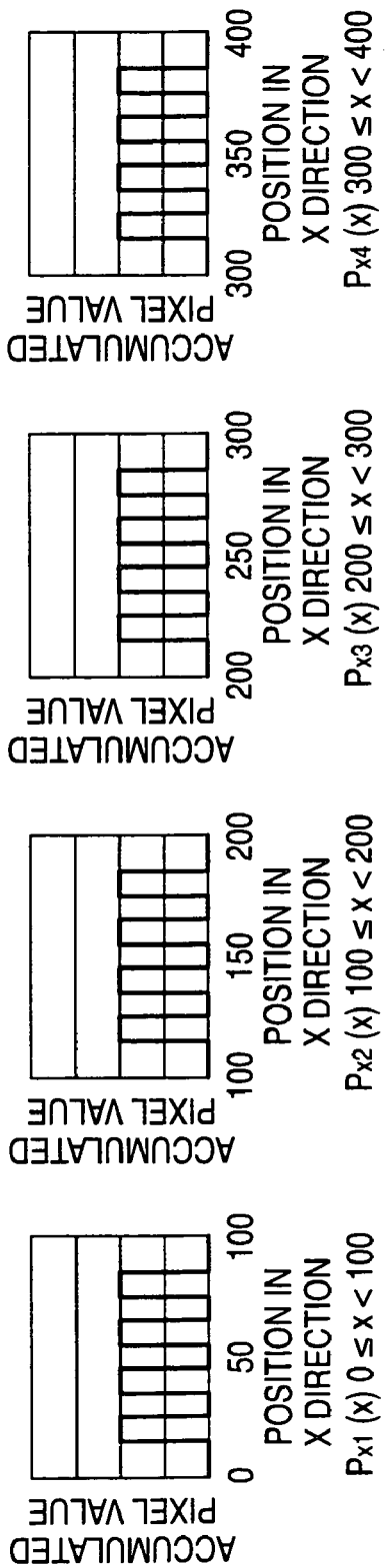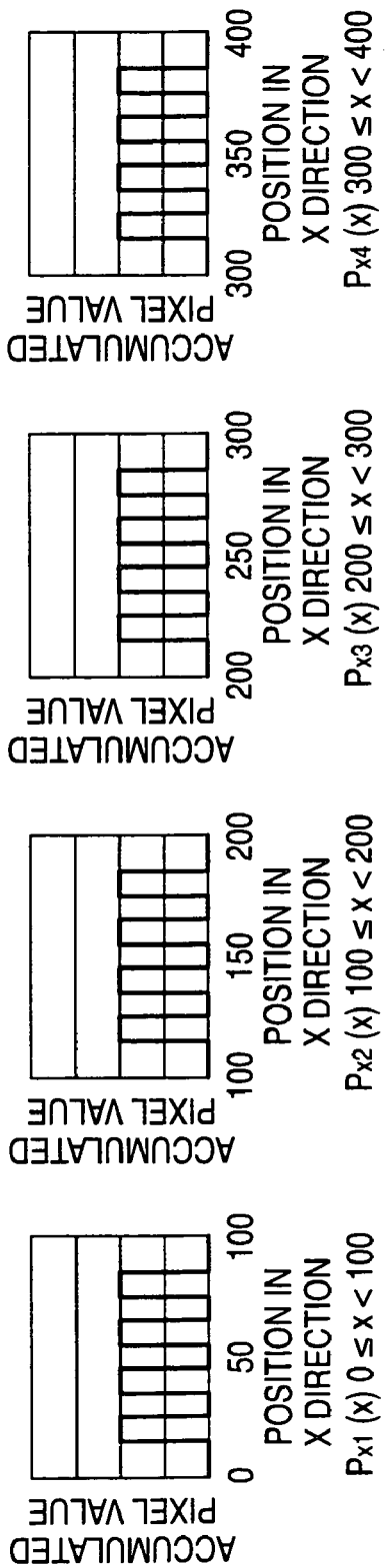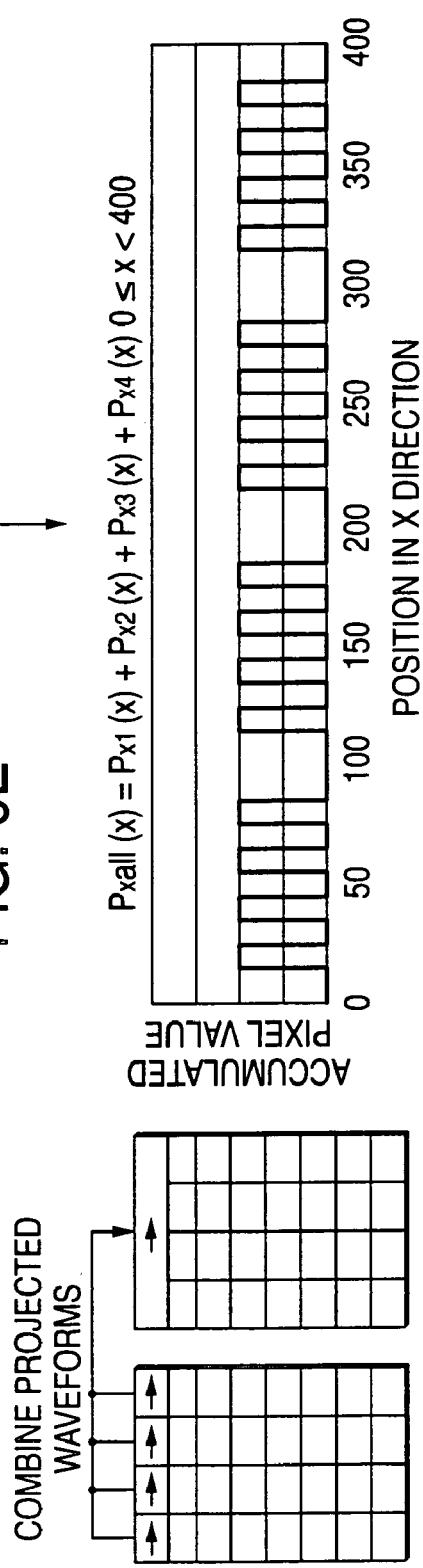

POSITION IN X
DIRECTION

P'x1 (x) 0 ≤ x < 100

POSITION IN X
DIRECTION

P'x2 (x) 0 ≤ x < 100

POSITION IN X
DIRECTION

P'xall (x) = P'x1 (x) + P'x2 (x)
0 ≤ x < 100

$P'_{y1}(y)\ 0 \leq y < 100$ $P'_{y2}(y)\ 0 \leq y < 100$ $P'_{yall}(y) = P'_{y1}(y) + P'_{y2}(y)$
$0 \leq y < 100$

| FEATURE VOLUME DATA OF REFERENCE IMAGE | 10 | 20 | 30 | 40 | 50 | 60 | 70 | 80 | 90 |
|---|---|---|---|---|---|---|---|---|---|
| FEATURE VOLUME DATA OF TARGET IMAGE | 13 | 21 | 34 | 44 | 49 | 58 | 74 | 81 | 95 |

FIG. 15A

| FEATURE VOLUME DATA OF REFERENCE IMAGE | 10 | 20 | 30 | 40 | 50 | 60 | 70 | 80 | 90 |
|---|---|---|---|---|---|---|---|---|---|
| FEATURE VOLUME DATA OF TARGET IMAGE | 13 | 21 | 34 | 44 | 49 | 58 | 74 | 81 | 95 |
| X-DIRECTION DISTORTION CORRECTION VALUE (FEATURE VOLUME DATA OF REFERENCE IMAGE -FEATURE VOLUME DATA OF TARGET IMAGE) | +3 | +1 | +4 | +4 | -1 | -2 | +4 | +1 | +5 |

FIG. 15B

| X COORDINATE OF REFERENCE IMAGE (PIXELS) | GEOMETRICAL DISTORTION CORRECTION VALUE FOR TARGET IMAGE (PIXELS) |
|---|---|
| 0≤15 | 3 |
| 16≤25 | 1 |
| 26≤45 | 4 |
| 46≤55 | -1 |
| 56≤65 | -2 |
| 66≤75 | 4 |
| 76≤85 | 1 |
| 86≤99 | 5 |

TO NEXT DRAWING

FIG. 16

| X COORDI-NATE OF REFERENCE IMAGE | X COORDI-NATE OF TARGET IMAGE | X COORDI-NATE OF REFERENCE IMAGE | X COORDI-NATE OF TARGET IMAGE | X COORDI-NATE OF REFERENCE IMAGE | X COORDI-NATE OF TARGET IMAGE | X COORDI-NATE OF REFERENCE IMAGE | X COORDI-NATE OF TARGET IMAGE |
|---|---|---|---|---|---|---|---|
| 0 | 3 | 25 | 26 | 50 | 49 | 75 | 79 |
| 1 | 4 | 26 | 30 | 51 | 50 | 76 | 77 |
| 2 | 5 | 27 | 31 | 52 | 51 | 77 | 78 |
| 3 | 6 | 28 | 32 | 53 | 52 | 78 | 79 |
| 4 | 7 | 29 | 33 | 54 | 53 | 79 | 80 |
| 5 | 8 | 30 | 34 | 55 | 54 | 80 | 81 |
| 6 | 9 | 31 | 35 | 56 | 54 | 81 | 82 |
| 7 | 10 | 32 | 36 | 57 | 55 | 82 | 83 |
| 8 | 11 | 33 | 37 | 58 | 56 | 83 | 84 |
| 9 | 12 | 34 | 38 | 59 | 57 | 84 | 85 |
| 10 | 13 | 35 | 39 | 60 | 58 | 85 | 86 |
| 11 | 14 | 36 | 40 | 61 | 59 | 86 | 91 |
| 12 | 15 | 37 | 41 | 62 | 60 | 87 | 92 |
| 13 | 16 | 38 | 42 | 63 | 61 | 88 | 93 |
| 14 | 17 | 39 | 43 | 64 | 62 | 89 | 94 |
| 15 | 18 | 40 | 44 | 65 | 63 | 90 | 95 |
| 16 | 17 | 41 | 45 | 66 | 70 | 91 | 96 |
| 17 | 18 | 42 | 46 | 67 | 71 | 92 | 97 |
| 18 | 19 | 43 | 47 | 68 | 72 | 93 | 98 |
| 19 | 20 | 44 | 48 | 69 | 73 | 94 | 99 |
| 20 | 21 | 45 | 49 | 70 | 74 | 95 | 99 |
| 21 | 22 | 46 | 45 | 71 | 75 | 96 | 99 |
| 22 | 23 | 47 | 46 | 72 | 76 | 97 | 99 |
| 23 | 24 | 48 | 47 | 73 | 77 | 98 | 99 |
| 24 | 25 | 49 | 48 | 74 | 78 | 99 | 99 |

| FEATURE VOLUME DATA OF REFERENCE IMAGE | 10 | 20 | 30 | 40 | 50 | 60 | 70 | 80 | 90 |
|---|---|---|---|---|---|---|---|---|---|
| FEATURE VOLUME DATA OF TARGET IMAGE | 13 | 21 | 34 | 44 | 49 | 58 | 74 | 81 | 95 |
| X-DIRECTION DISTORTION CORRECTION VALUE (FEATURE VOLUME DATA OF REFERENCE IMAGE - FEATURE VOLUME DATA OF TARGET IMAGE) | +3 | +1 | +4 | +4 | -1 | -2 | +4 | +1 | +5 |

| X COORDINATE OF REFERENCE IMAGE (PIXELS) | GEOMETRICAL DISTORTION CORRECTION VALUE FOR TARGET IMAGE (PIXELS) |
|---|---|
| 0 ≤ 99 | 2 |

TO NEXT DRAWING

FIG. 19

| X COORDI-NATE OF REFERENCE IMAGE | X COORDI-NATE OF TARGET IMAGE | X COORDI-NATE OF REFERENCE IMAGE | X COORDI-NATE OF TARGET IMAGE | X COORDI-NATE OF REFERENCE IMAGE | X COORDI-NATE OF TARGET IMAGE | X COORDI-NATE OF REFERENCE IMAGE | X COORDI-NATE OF TARGET IMAGE |
|---|---|---|---|---|---|---|---|
| 0 | 2 | 25 | 27 | 50 | 52 | 75 | 77 |
| 1 | 3 | 26 | 28 | 51 | 53 | 76 | 78 |
| 2 | 4 | 27 | 29 | 52 | 54 | 77 | 79 |
| 3 | 5 | 28 | 30 | 53 | 55 | 78 | 80 |
| 4 | 6 | 29 | 31 | 54 | 56 | 79 | 81 |
| 5 | 7 | 30 | 32 | 55 | 57 | 80 | 82 |
| 6 | 8 | 31 | 33 | 56 | 58 | 81 | 83 |
| 7 | 9 | 32 | 34 | 57 | 59 | 82 | 84 |
| 8 | 10 | 33 | 35 | 58 | 60 | 83 | 85 |
| 9 | 11 | 34 | 36 | 59 | 61 | 84 | 86 |
| 10 | 12 | 35 | 37 | 60 | 62 | 85 | 87 |
| 11 | 13 | 36 | 38 | 61 | 63 | 86 | 88 |
| 12 | 14 | 37 | 39 | 62 | 64 | 87 | 89 |
| 13 | 15 | 38 | 40 | 63 | 65 | 88 | 90 |
| 14 | 16 | 39 | 41 | 64 | 66 | 89 | 91 |
| 15 | 17 | 40 | 42 | 65 | 67 | 90 | 92 |
| 16 | 18 | 41 | 43 | 66 | 68 | 91 | 93 |
| 17 | 19 | 42 | 44 | 67 | 69 | 92 | 94 |
| 18 | 20 | 43 | 45 | 68 | 70 | 93 | 95 |
| 19 | 21 | 44 | 46 | 69 | 71 | 94 | 96 |
| 20 | 22 | 45 | 47 | 70 | 72 | 95 | 97 |
| 21 | 23 | 46 | 48 | 71 | 73 | 96 | 98 |
| 22 | 24 | 47 | 49 | 72 | 74 | 97 | 99 |
| 23 | 25 | 48 | 50 | 73 | 75 | 98 | 99 |
| 24 | 26 | 49 | 51 | 74 | 76 | 99 | 99 |

FIG. 20A
| POSITION OF PIXEL IN X DIRECTION (PIXELS) | GEOMETRICAL DISTORTION CORRECTION VALUE (PIXELS) |
|---|---|
| 10 | +3 |
| 20 | +1 |
| 30 | +4 |
| 40 | +4 |
| 50 | -1 |
| 60 | -2 |
| 70 | +4 |
| 80 | +1 |
| 90 | +5 |
FIG. 20B
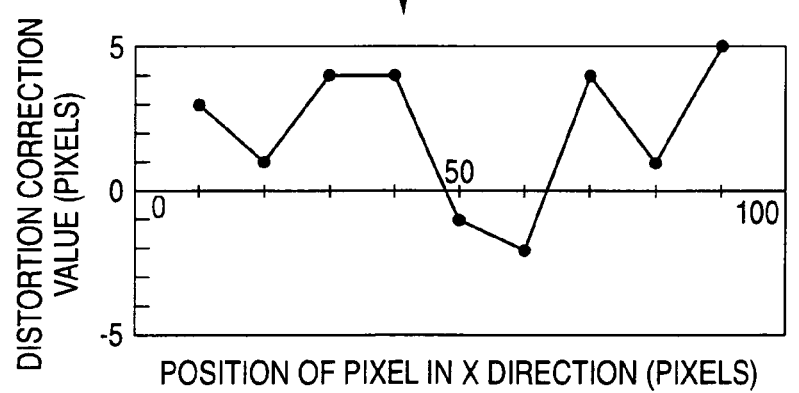
FIG. 20C
INTERPOLATION (DISCRETE)
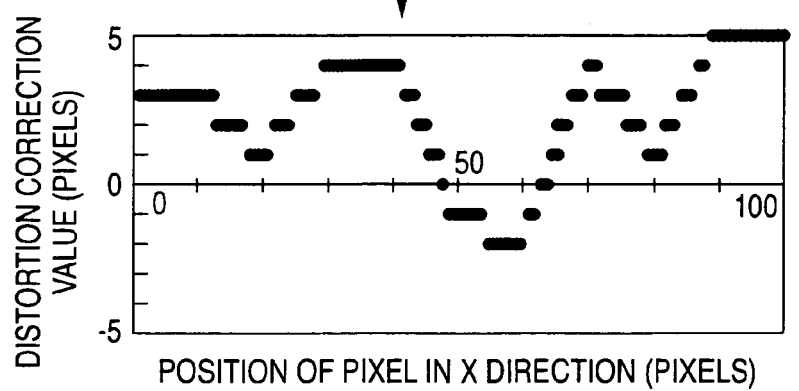

| FEATURE VOLUME DATA OF REFERENCE IMAGE | 10 | 20 | 30 | 40 | 50 | 60 | 70 | 80 | 90 |
|---|---|---|---|---|---|---|---|---|---|
| FEATURE VOLUME DATA OF TARGET IMAGE | 13 | 21 | 34 | 44 | 49 | 58 | 74 | 81 | 95 |
| X-DIRECTION DISTORTION CORRECTION VALUE (FEATURE VOLUME DATA OF REFERENCE IMAGE -FEATURE VOLUME DATA OF TARGET IMAGE) | +3 | +1 | +4 | +4 | -1 | -2 | +4 | +1 | +5 |

TO NEXT DRAWING

FIG. 22

| X COORDI-NATE OF REFERENCE IMAGE | X COORDI-NATE OF TARGET IMAGE | X COORDI-NATE OF REFERENCE IMAGE | X COORDI-NATE OF TARGET IMAGE | X COORDI-NATE OF REFERENCE IMAGE | X COORDI-NATE OF TARGET IMAGE | X COORDI-NATE OF REFERENCE IMAGE | X COORDI-NATE OF TARGET IMAGE |
|---|---|---|---|---|---|---|---|
| 0 | 3 | 25 | 28 | 50 | 49 | 75 | 78 |
| 1 | 4 | 26 | 29 | 51 | 50 | 76 | 78 |
| 2 | 5 | 27 | 30 | 52 | 51 | 77 | 79 |
| 3 | 6 | 28 | 31 | 53 | 52 | 78 | 80 |
| 4 | 7 | 29 | 33 | 54 | 53 | 79 | 80 |
| 5 | 8 | 30 | 34 | 55 | 53 | 80 | 81 |
| 6 | 9 | 31 | 35 | 56 | 54 | 81 | 82 |
| 7 | 10 | 32 | 36 | 57 | 55 | 82 | 84 |
| 8 | 11 | 33 | 37 | 58 | 56 | 83 | 85 |
| 9 | 12 | 34 | 38 | 59 | 57 | 84 | 87 |
| 10 | 13 | 35 | 39 | 60 | 58 | 85 | 88 |
| 11 | 14 | 36 | 40 | 61 | 60 | 86 | 89 |
| 12 | 15 | 37 | 41 | 62 | 61 | 87 | 91 |
| 13 | 15 | 38 | 42 | 63 | 63 | 88 | 92 |
| 14 | 16 | 39 | 43 | 64 | 64 | 89 | 94 |
| 15 | 17 | 40 | 44 | 65 | 66 | 90 | 95 |
| 16 | 18 | 41 | 45 | 66 | 68 | 91 | 96 |
| 17 | 19 | 42 | 45 | 67 | 69 | 92 | 97 |
| 18 | 19 | 43 | 46 | 68 | 71 | 93 | 98 |
| 19 | 20 | 44 | 46 | 69 | 72 | 94 | 99 |
| 20 | 21 | 45 | 47 | 70 | 74 | 95 | 99 |
| 21 | 22 | 46 | 47 | 71 | 75 | 96 | 99 |
| 22 | 24 | 47 | 48 | 72 | 75 | 97 | 99 |
| 23 | 25 | 48 | 48 | 73 | 76 | 98 | 99 |
| 24 | 26 | 49 | 48 | 74 | 77 | 99 | 99 |

FIG. 23A X DIRECTION FORWARD

| X COORDI-NATE OF REFERENCE IMAGE (PIXELS) | X COORDI-NATE OF TARGET IMAGE (PIXELS) |
|---|---|
| $X_0$ | $X_0 + S_X$ |
| $X_1$ | $X_1 + S_X$ |
| $X_2$ | $X_2 + S_X$ |
| ... | ... |
| $X_m$ | $X_m + S_X$ |
| ... | ... |
| $X_{M-2}$ | $X_{M-2} + S_X$ |
| $X_{M-1}$ | $X_{M-1} + S_X$ |
| $X_M$ | $X_M + S_X$ |

$0 \leq m \leq M-1$
$0 \leq X_m + S_X \leq I-1$

CORRECTION VALUE $S_X$ = $\begin{cases} \text{const.} \\ \text{or} \\ f(X_m) \end{cases}$

FIG. 23B Y DIRECTION FORWARD

| Y COORDI-NATE OF REFERENCE IMAGE (PIXELS) | Y COORDI-NATE OF TARGET IMAGE (PIXELS) |
|---|---|
| $Y_0$ | $Y_0 + S_Y$ |
| $Y_1$ | $Y_1 + S_Y$ |
| $Y_2$ | $Y_2 + S_Y$ |
| ... | ... |
| $Y_n$ | $Y_n + S_Y$ |
| ... | ... |
| $Y_{N-2}$ | $Y_{N-2} + S_Y$ |
| $Y_{N-1}$ | $Y_{N-1} + S_Y$ |
| $Y_N$ | $Y_N + S_Y$ |

$0 \leq n \leq N-1$
$0 \leq Y_n + S_Y \leq J-1$

CORRECTION VALUE $S_Y$ = $\begin{cases} \text{const.} \\ \text{or} \\ f(Y_n) \end{cases}$

FIG. 23C X DIRECTION BACKWARD

| X COORDI-NATE OF TARGET IMAGE (PIXELS) | X COORDI-NATE OF REFERENCE IMAGE (PIXELS) |
|---|---|
| $X'_0$ | $X'_0 + S'_X$ |
| $X'_1$ | $X'_1 + S'_X$ |
| $X'_2$ | $X'_2 + S'_X$ |
| ... | ... |
| $X'_i$ | $X'_i + S'_X$ |
| ... | ... |
| $X'_{I-2}$ | $X'_{I-2} + S'_X$ |
| $X'_{I-1}$ | $X'_{I-1} + S'_X$ |
| $X'_I$ | $X'_I + S'_X$ |

$0 \leq i \leq I-1$
$0 \leq X'_i + S'_X \leq M-1$

CORRECTION VALUE $S'_X$ = $\begin{cases} \text{const.} \\ \text{or} \\ f(X'_i) \end{cases}$

FIG. 23D Y DIRECTION BACKWARD

| Y COORDI-NATE OF TARGET IMAGE (PIXELS) | X COORDI-NATE OF REFERENCE IMAGE (PIXELS) |
|---|---|
| $Y'_0$ | $Y'_0 + S'_Y$ |
| $Y'_1$ | $Y'_1 + S'_Y$ |
| $Y'_2$ | $Y'_2 + S'_Y$ |
| ... | ... |
| $Y'_j$ | $Y'_j + S'_Y$ |
| ... | ... |
| $Y'_{J-2}$ | $Y'_{J-2} + S'_Y$ |
| $Y'_{J-1}$ | $Y'_{J-1} + S'_Y$ |
| $Y'_J$ | $Y'_J + S'_Y$ |

$0 \leq j \leq J-1$
$0 \leq Y'_j + S'_Y \leq N-1$

CORRECTION VALUE $S'_Y$ = $\begin{cases} \text{const.} \\ \text{or} \\ f(Y'_j) \end{cases}$

REFERENCE IMAGE M × N

TARGET IMAGE I × J

FIG. 24

REFERENCE IMAGE M x N

TARGET IMAGE I x J

FORWARD

| X COORDINATE OF REFERENCE IMAGE (PIXELS) | Y COORDINATE OF REFERENCE IMAGE (PIXELS) | X COORDINATE OF TARGET IMAGE (PIXELS) | Y COORDINATE OF TARGET IMAGE (PIXELS) |
|---|---|---|---|
| $X_0$ | $Y_0$ | $X_0 + S_X$ | $Y_0 + S_Y$ |
| $X_1$ | $Y_0$ | $X_1 + S_X$ | $Y_0 + S_Y$ |
| $X_2$ | $Y_0$ | $X_2 + S_X$ | $Y_0 + S_Y$ |
| ... | ... | ... | ... |
| $X_m$ | ... | $X_m + S_X$ | ... |
| ... | ... | ... | ... |
| $X_{M-2}$ | $Y_0$ | $X_{M-2} + S_X$ | $Y_0 + S_Y$ |
| $X_{M-1}$ | $Y_0$ | $X_{M-1} + S_X$ | $Y_0 + S_Y$ |
| $X_M$ | $Y_0$ | $X_M + S_X$ | $Y_0 + S_Y$ |
| $X_0$ | $Y_1$ | $X_0 + S_X$ | $Y_1 + S_Y$ |
| $X_1$ | $Y_1$ | $X_1 + S_X$ | $Y_1 + S_Y$ |
| $X_2$ | $Y_1$ | $X_2 + S_X$ | $Y_1 + S_Y$ |
| ... | ... | ... | ... |
| ... | $Y_n$ | ... | $Y_n + S_Y$ |
| ... | ... | ... | ... |
| $X_{M-2}$ | $Y_N$ | $X_{M-2} + S_X$ | $Y_N + S_Y$ |
| $X_{M-1}$ | $Y_N$ | $X_{M-1} + S_X$ | $Y_N + S_Y$ |
| $X_M$ | $Y_N$ | $X_M + S_X$ | $Y_N + S_Y$ |

$0 \leq m \leq M-1$
$0 \leq X_m + S_X \leq I-1$ $0 \leq n \leq N-1$
$0 \leq Y_n + S_Y \leq J-1$ $$\text{CORRECTION VALUE } S_X = \begin{cases} \text{const.} \\ \text{or} \\ f(X_m) \end{cases}$$

$$\text{CORRECTION VALUE } S_Y = \begin{cases} \text{const.} \\ \text{or} \\ f(Y_n) \end{cases}$$

FIG. 25

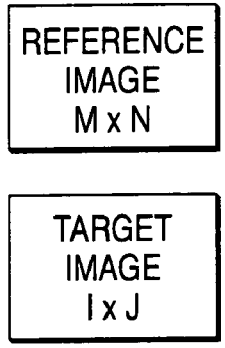

BACKWARD

| X COORDINATE OF TARGET IMAGE (PIXELS) | Y COORDINATE OF TARGET IMAGE (PIXELS) | X COORDINATE OF REFERENCE IMAGE (PIXELS) | Y COORDINATE OF REFERENCE IMAGE (PIXELS) |
|---|---|---|---|
| $X'_0$ | $Y'_0$ | $X'_0 + S'_X$ | $Y'_0 + S'_Y$ |
| $X'_1$ | $Y'_0$ | $X'_1 + S'_X$ | $Y'_0 + S'_Y$ |
| $X'_2$ | $Y'_0$ | $X'_2 + S'_X$ | $Y'_0 + S'_Y$ |
| ... | ... | ... | ... |
| $X'_i$ | ... | $X'_i + S'_X$ | ... |
| ... | ... | ... | ... |
| $X'_{I-2}$ | $Y'_0$ | $X'_{I-2} + S'_X$ | $Y'_0 + S'_Y$ |
| $X'_{I-1}$ | $Y'_0$ | $X'_{I-1} + S'_X$ | $Y'_0 + S'_Y$ |
| $X'_I$ | $Y'_0$ | $X'_I + S'_X$ | $Y'_0 + S'_Y$ |
| $X'_0$ | $Y'_1$ | $X'_0 + S'_X$ | $Y'_1 + S'_Y$ |
| $X'_1$ | $Y'_1$ | $X'_1 + S'_X$ | $Y'_1 + S'_Y$ |
| $X'_2$ | $Y'_1$ | $X'_2 + S'_X$ | $Y'_1 + S'_Y$ |
| ... | ... | ... | ... |
| ... | $Y'_j$ | ... | $Y'_j + S'_Y$ |
| ... | ... | ... | ... |
| $X'_{I-2}$ | $Y'_J$ | $X'_{I-2} + S'_X$ | $Y'_J + S'_Y$ |
| $X'_{I-1}$ | $Y'_J$ | $X'_{I-1} + S'_X$ | $Y'_J + S'_Y$ |
| $X'_I$ | $Y'_J$ | $X'_I + S'_X$ | $Y'_J + S'_Y$ |

$0 \leq i \leq I-1$
$0 \leq X'_i + S'_X \leq M-1$ $0 \leq j \leq J-1$
$0 \leq Y'_j + S'_Y \leq N-1$ CORRECTION VALUE $S'_X$ = $\begin{cases} \text{const.} \\ \text{or} \\ f(X'_i) \end{cases}$ CORRECTION VALUE $S'_Y$ = $\begin{cases} \text{const.} \\ \text{or} \\ f(Y'_j) \end{cases}$

REFERENCE IMAGE

TARGET IMAGE

CHECK WHETHER BLACK PIXEL IS PRESENT
IN ANY ONE OF 5 x 5 PIXELS AROUND
OBJECTIVE PIXEL OR NOT

REFERENCE IMAGE (x"2org, y"2org)

TARGET IMAGE (x2cap, y2cap)

CHECK WHETHER BLACK PIXEL IS PRESENT
IN ANY ONE OF 3 x 3 PIXELS AROUND
OBJECTIVE PIXEL OR NOT

IMAGE PROCESSING APPARATUS, IMAGE PROCESSING METHOD, IMAGE PROCESSING PROGRAM, PRINTED MATTER INSPECTION APPARATUS, PRINTED MATTER INSPECTION METHOD AND PRINTED MATTER INSPECTION PROGRAM

BACKGROUND OF THE INVENTION

1. Field of the Invention

The present invention relates to a technique for collating a target image as a subject of collation and inspection with a reference image as a sample of collation and inspecting the target image.

2. Description of the Related Art

An inspection method using collation of an image has been heretofore utilized in various kinds of inspection processes such as visual inspection of various kinds of objects, inspection of printed matter for image quality defects (such as whitening or staining). For collation of an image, a reference image is generally prepared as a sample of collation for indicating a normal state of the image. A target image which is a subject of collation is acquired. The target image and the reference image are superposed on each other and compared/collated with each other to thereby detect a mismatch portion (i.e. judge whether the two images are matched or not).

The target image acquired, however, contains geometrical distortion such as positional displacement or scaling up/down (change in magnification). There is a problem that highly accurate collation cannot be provided when the reference image is merely interposed on the target image.

The target image is studded with a large number of portions suffering from geometrical distortion such as positional displacement or scaling up/down. Measures against such geometrical distortion are known as follows. For example, Japanese Patent No. 3,140,838 has described a method in which: a plurality of split images are generated from at least one of a reference image and a target image as a subject of inspection; positional displacement correction values are calculated according to the split images; and positional displacement of the image is corrected on the basis of the correction values. For example, JP-A-11-194154 has described a method in which: a target image as a subjection of inspection is split into split images each having a size sufficient to ignore geometrical distortion; a reference image is split into split images in accordance with the size; positional displacement of each split image is detected with accuracy capable of measuring a size of not larger than a pixel size; and a judgment is made on the basis of the detected positional displacement as to whether the target image is defective or not. In the methods described in Japanese Patent No. 3,140,838 and JP-A-11-194154, geometrical distortion however remains in each generated split image if geometrical distortion is unevenly scattered in the target image. As a result, geometrical distortion remains in each block image. There is a problem that collation accuracy is lowered.

As is obvious from the techniques in the related art, geometrical distortion unevenly scattered in the target image is required to be entirely removed so that the target image can be pixel-by-pixel collated with the reference image accurately. As the related art for this requirement, there is known an inspection method, for example, as described in JP-A-2002-181732, in which: an image of an object provided for calibration and having a plurality of identification marks having known positional relations is photographed so that geometrical distortion components appearing in the image are examined and held as geometrical distortion calibration data in advance; and geometrical distortion of the target image is corrected on the basis of the geometrical distortion calibration data before image collation is performed. In the inspection method, because calibration data are acquired and held in advance, there is no problem if the trend of generation of geometrical distortion in the target image is unchanged at every time of collation/inspection. If the trend of generation of geometrical distortion is changed at every time, it is however conceived that the trend of geometrical distortion calibration data is different from the trend of actual geometrical distortion. There is a problem that collation accuracy is lowered because the influence of geometrical distortion cannot be entirely removed.

There is also known a method, for example, as described in JP-A-8-35936, in which: split images are generated from a reference image and a target image as a subjection of inspection; the split images of the target image are compared with the split images of the reference image respectively to thereby generate a plurality of distortion vectors indicating positional changes; and positional changes are corrected on the basis of the distortion vectors. In this method, the average trend of geometrical distortion scattered in the split images can be removed in the same manner as in the case where correction is performed in accordance with each block. It is however impossible to remove distortion disagreeing with the typical trend if geometrical distortion is unevenly scattered in the split images. As a result, there is a problem that collation accuracy is lowered because geometrical distortion remains in the split images.

There is further known a fingerprint checking apparatus, for example, as described in JP-A-7-57085, in which: waveforms of longest ridge width distributions in X and Y directions are obtained from a fingerprint to be registered; only characteristic peaks (limbs) are extracted from the waveforms of X- and Y-direction longest ridge width distributions in accordance with a predetermined rule; and waveforms of X- and Y-direction longest ridge width distributions formed from the limbs (i.e., longest ridge width local maximal value extraction waveforms) are stored as registered data to be used for positional correction. In this apparatus, it is however impossible to remove the influence of scaling up/down because there is no measure against scaling up/down of the target image. There is therefore a problem that collation accuracy is lowered.

As described above, the techniques in the related art have a problem that geometrical distortion, such as positional displacement or scaling up/down, unevenly scattered in the target image cannot be removed efficiently so that highly accurate inspection cannot be performed.

SUMMARY OF THE INVENTION

The invention is developed in consideration of such circumstances. An object of the invention is to provide an image processing apparatus, an image processing method and an image processing program in which a target image as a subject of inspection can be processed accurately and speedily while geometrical distortion such as positional displacement or scaling up/down unevenly scattered in the target image is removed so that correction values against the geometrical distortion are not affected by image quality defects. Another object of the invention is to provide a printed matter inspection apparatus, a printed matter inspection method and a printed matter inspection program which use the image processing apparatus, the image processing method and the image processing program so that printed matter can be inspected accurately and speedily.

The invention provides an image processing apparatus and an image processing method for collating a target image as a subject of inspection with a reference image and an image processing program executed by a computer for performing such image processing. Projected waveforms are generated from the reference image and the target image respectively. Feature volume data are generated on the basis of feature volumes extracted from the projected waveforms respectively. The feature volume data of the target image are correlated with the feature volume data of the reference image. Correction values used for correcting geometrical distortion between the reference image and the target image are calculated on the basis of a result of correlation between the feature volume data. The target image is collated with the reference image on the basis of the correction values.

In this manner, the feature volume data extracted from the target image are correlated with the feature volume data extracted from the reference image so that the target image can be collated with the reference image in consideration of geometrical distortion. For example, even in the case where positional displacement, scaling up/down, or the like is unevenly scattered in the target image, the positional displacement, scaling up/down, or the like can be removed so efficiently that highly accurate collation can be performed. In addition, when each of the reference image and the target image is processed in the aforementioned manner, an accurate collation process can be performed even in the case where the trend of generation of geometrical distortion is changed at every time.

After correction value data used for correcting geometrical distortion are obtained on the basis of correlation between the feature volume data in the aforementioned manner, for example, an n-dimensional lookup table may be generated on the basis of the correction value data or on the basis of the correction value data and data interpolated between the correction value data. In this case, the n-dimensional lookup table is referred to at the time of collation so that a collation process can be performed in consideration of correction of geometrical distortion. The use of the n-dimensional lookup table permits a geometrical distortion correcting process to be executed speedily. Accordingly, collation can be speeded up as a whole.

Incidentally, correlation between the feature volume data can be obtained, for example, by a method of correlating elements of the feature volume data with each other successively or by DP matching.

For example, the following method may be used for generating projected waveforms of the reference image and the target image. That is, each image is split into m×n blocks to generate split images. Projected waveforms are generated from the split images respectively. The projected waveforms are combined into one to generate a projected waveform of the whole image or a partial image larger in area than one split image. A method for generating projected waveforms by two scanning cycles in two directions perpendicular to each other is generally used. In this method, a large time is required for accessing a memory at scanning in at least one direction. However, when the split images are scanned by the method according to the invention, projected waveforms in two directions can be generated by only one scanning cycle. Accordingly, the processing time can be reduced remarkably, so that high-speed processing can be attained.

The invention also provides a printed matter inspection apparatus and a printed matter inspection method for inspecting printed matter and a printed matter inspection program executed by a computer for inspecting printed matter. An image of printed matter is read and used as a target image which is a subject of inspection. An image used for forming the printed matter is used as a reference image. The image processing apparatus and the image processing method according to the invention are used or the image processing program according to the invention is executed for collating the target image with the reference image. As a result, even in the case where geometrical distortion such as positional displacement or scaling up/down is unevenly scattered in the printed matter or in the target image read from the printed matter, the geometrical distortion can be removed efficiently and the printed matter can be inspected accurately and speedily without influence of image quality defects.

BRIEF DESCRIPTION OF THE DRAWINGS

These and other objects and advantages of this invention will become more fully apparent from the following detailed description taken with the accompanying drawings in which:

FIGS. 5A to 5D are views for explaining an example of a process for combining split projected waveforms in an X direction;

FIGS. 6A to 6E are views for explaining simple mathematization in an example of the process for combining split projected waveforms in the X direction;

FIGS. 15A and 15B are views for explaining an example of a process for generating a forward lookup table from X-direction feature volume correlation data;

FIG. 16 is a view for explaining an example of the lookup table generated;

FIG. 19 is a view for explaining another example of the lookup table generated;

FIGS. 20A to 20C are views for explaining an example of a process for generating an interpolated lookup table;

FIG. 22 is a view for explaining an example of the X-direction forward interpolated lookup table generated;

FIGS. 23A to 23D are views for explaining a general form of one-dimensional lookup tables;

FIG. 24 is a view for explaining a general form of a forward two-dimensional lookup table;

FIG. 25 is a view for explaining a general form of a backward two-dimensional lookup table;

DETAILED DESCRIPTION OF THE PREFERRED EMBODIMENTS

Figure 1:
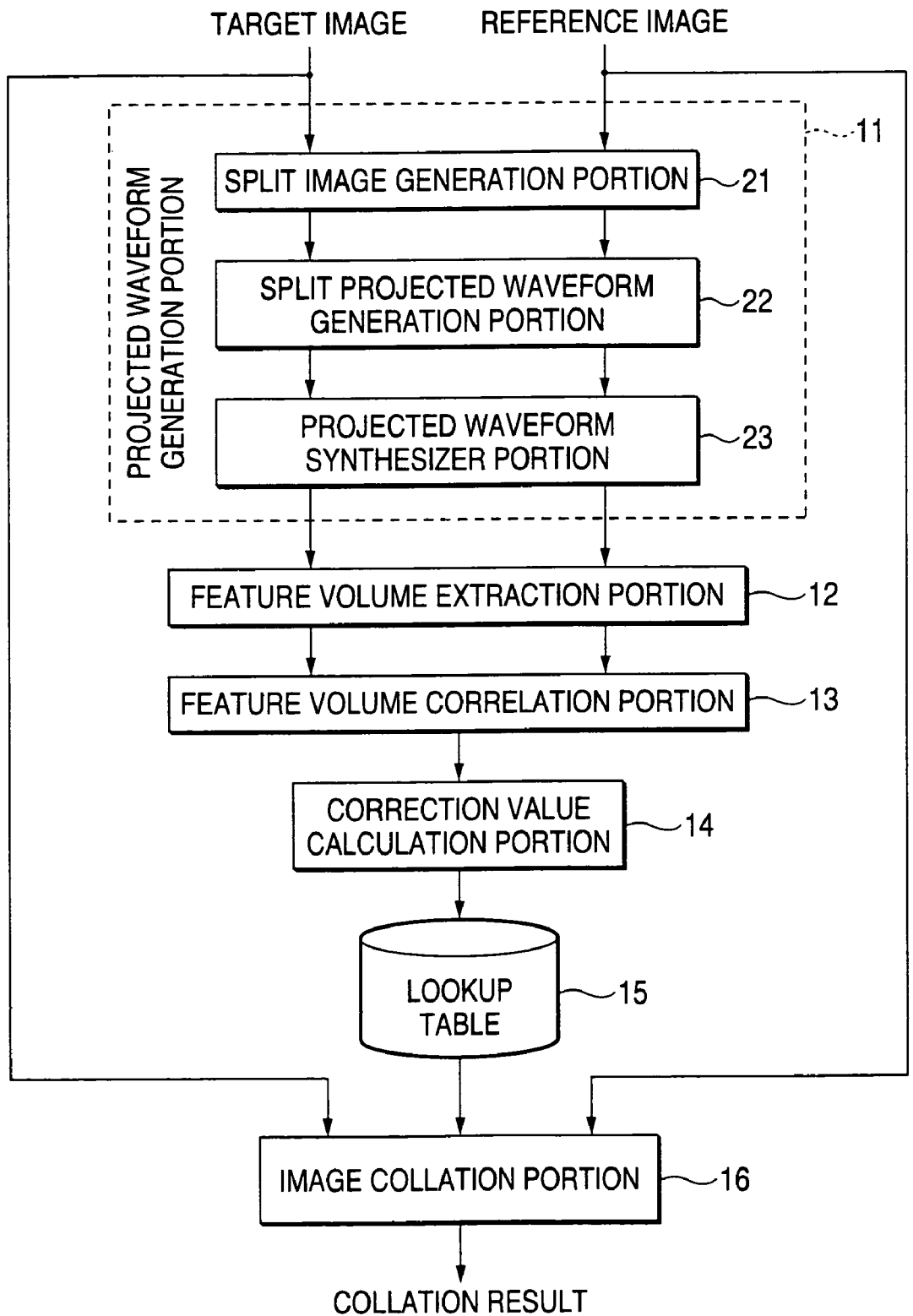
FIG. 1 is a block diagram showing an embodiment of an image processing apparatus and an image processing method according to the invention.

FIG. 1 is a block diagram showing an embodiment of an image processing apparatus and an image processing method according to the invention. In FIG. 1, the reference numeral 11 designates a projected waveform generation portion; 12, a feature volume extraction portion; 13, a feature volume correlation portion; 14, a correction value calculation portion; 15, a lookup table; 16, an image collation portion; 21, a split image generation portion; 22, a split projected waveform generation portion; and 23, a projected waveform synthesizer portion.

The projected waveform generation portion 11 generates projected waveforms of a reference image as a sample of collation and a target image as a subject of collation and inspection. Any suitable method can be used for generating projected waveforms. In this embodiment, a method for generating projected waveforms in accordance with split images and synthesizing the projected waveforms is used in the condition that the split image generation portion 21, the split projected waveform generation portion 22 and the projected waveform synthesizer portion 23 are provided in order to generate the projected waveforms speedily.

The split image generation portion 21 generates split images by splitting each image (each of the reference image and the target image) into m×n blocks. The split projected waveform generation portion 22 generates projected waveforms from the split images respectively. The projected waveform synthesizer portion 23 generates a projected waveform of the whole image or a partial image larger in area than one split image by combining the projected waveforms generated in accordance with the split images respectively.

The feature volume extraction portion 12 extracts feature volumes from the projected waveforms of the reference image and the target image generated by the projected waveform generation portion 11 and generates feature volume data for the reference image and the target image respectively.

The feature volume correlation portion 13 correlates the feature volume data extracted by the feature volume extraction portion 12, that is, correlates the feature volume data of the target image with the feature volume data of the reference image. Elements of the feature volume data may be correlated with each other successively to thereby perform correlation between the feature volume data. Alternatively, the feature volume data may be correlated with each other, for example, by DP matching or the like.

The correction value calculation portion 14 calculates correction values in accordance with geometrical distortion between the reference image and the target image on the basis of a result of the correlation of the feature volume data obtained by the feature volume correlation portion 13. On this occasion, an n-dimensional lookup table 15 on which the calculated correction values are held or the correction values and data interpolated between the correction values are held and which is used for correcting the geometrical distortion is generated.

The image collation portion 16 collates the target image with the reference image in consideration of the geometrical distortion by using the correction values calculated by the correction value calculation portion 14 or the lookup table 15 generated by the correction value calculation portion 14. Alternatively, an image corrected in geometrical distortion may be generated before collation.

Figure 2:
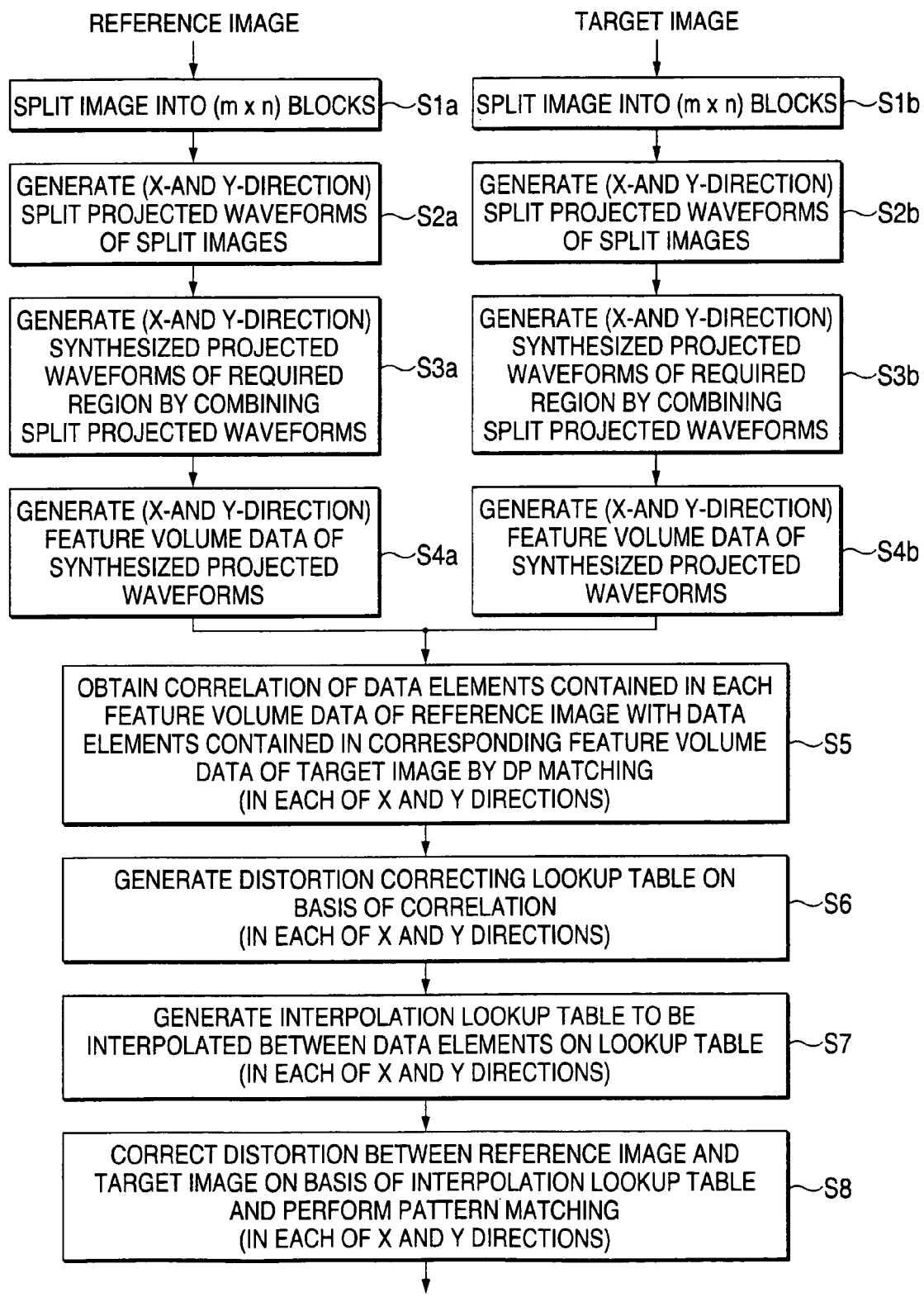
FIG. 2 is a flow chart showing an example of operation in the embodiment of the image processing apparatus and the image processing method according to the invention.
Figure 3:
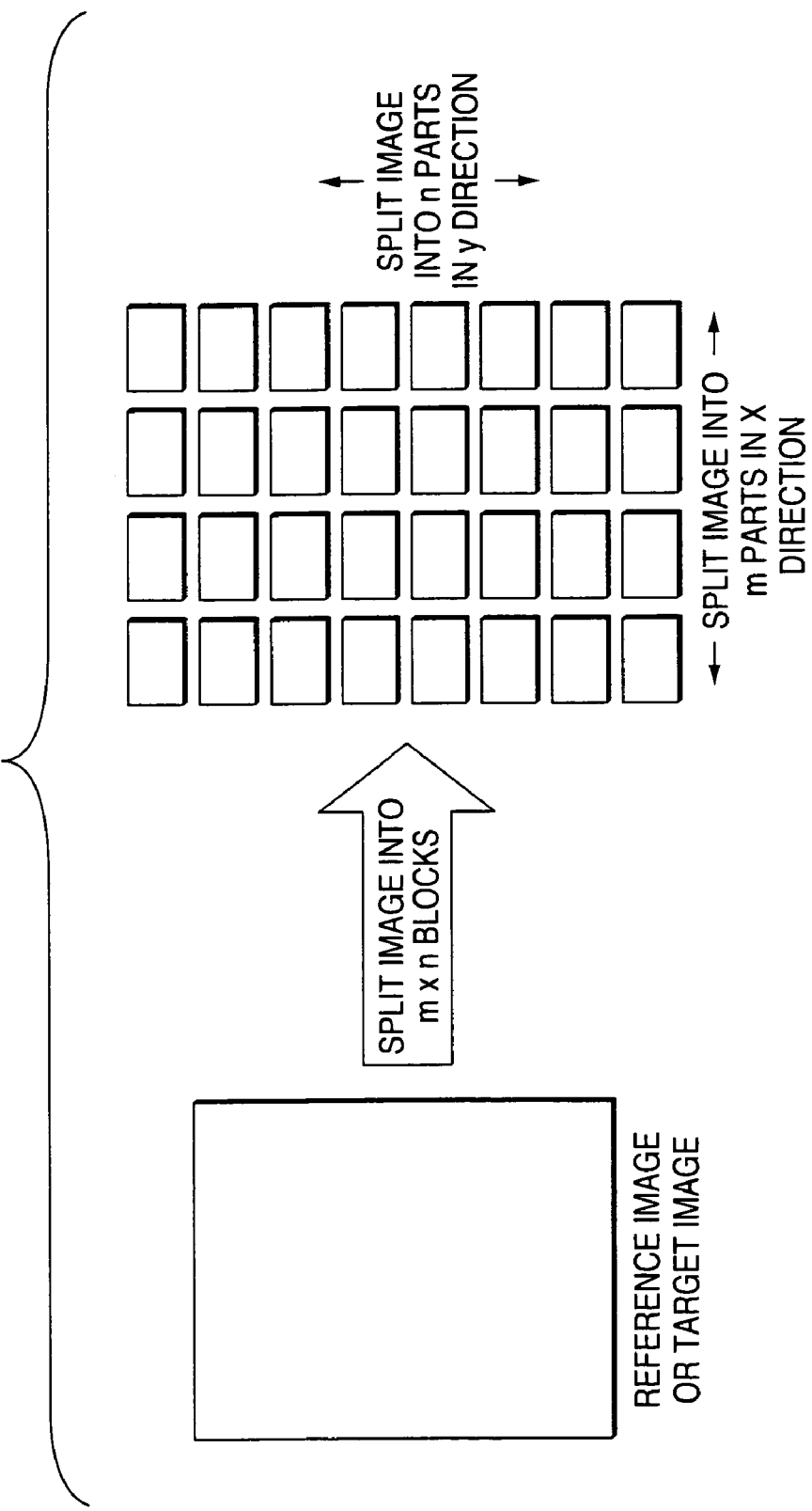
FIG. 3 is a conceptual view showing generation of split images.

FIG. 2 is a flow chart showing an example of operation in the embodiment of the image processing apparatus and the image processing method according to the invention. In step S1a, the split image generation portion 21 of the projected waveform generation portion 11 generates m×n split images by splitting the reference image into m parts in an X direction and n parts in a Y direction. On this occasion, the reference image may be split into m×n parts equally or a region of the reference image required for collation and inspection may be extracted. Alternatively, the reference image may be used as its original image without splitting or a memory region corresponding to the original image may be designated without generation of any split image. FIG. 3 is a conceptual view showing the generation of split images. FIG. 3 shows the case, by way of example, where the reference image is split equally in the condition that m and n are equal to 4 and 8 respectively. For the sake of simplification of description, assume that each of the reference image and the target image is a two-valued (binary) image having an image size of 400 pixels by 800 pixels. Accordingly, each split image has an image size of 100 pixels by 100 pixels. Although the same condition applies to the following description, the invention is not limited thereto. In step S1b, the target image is processed in the same manner as in the step S1a.

Figure 4:
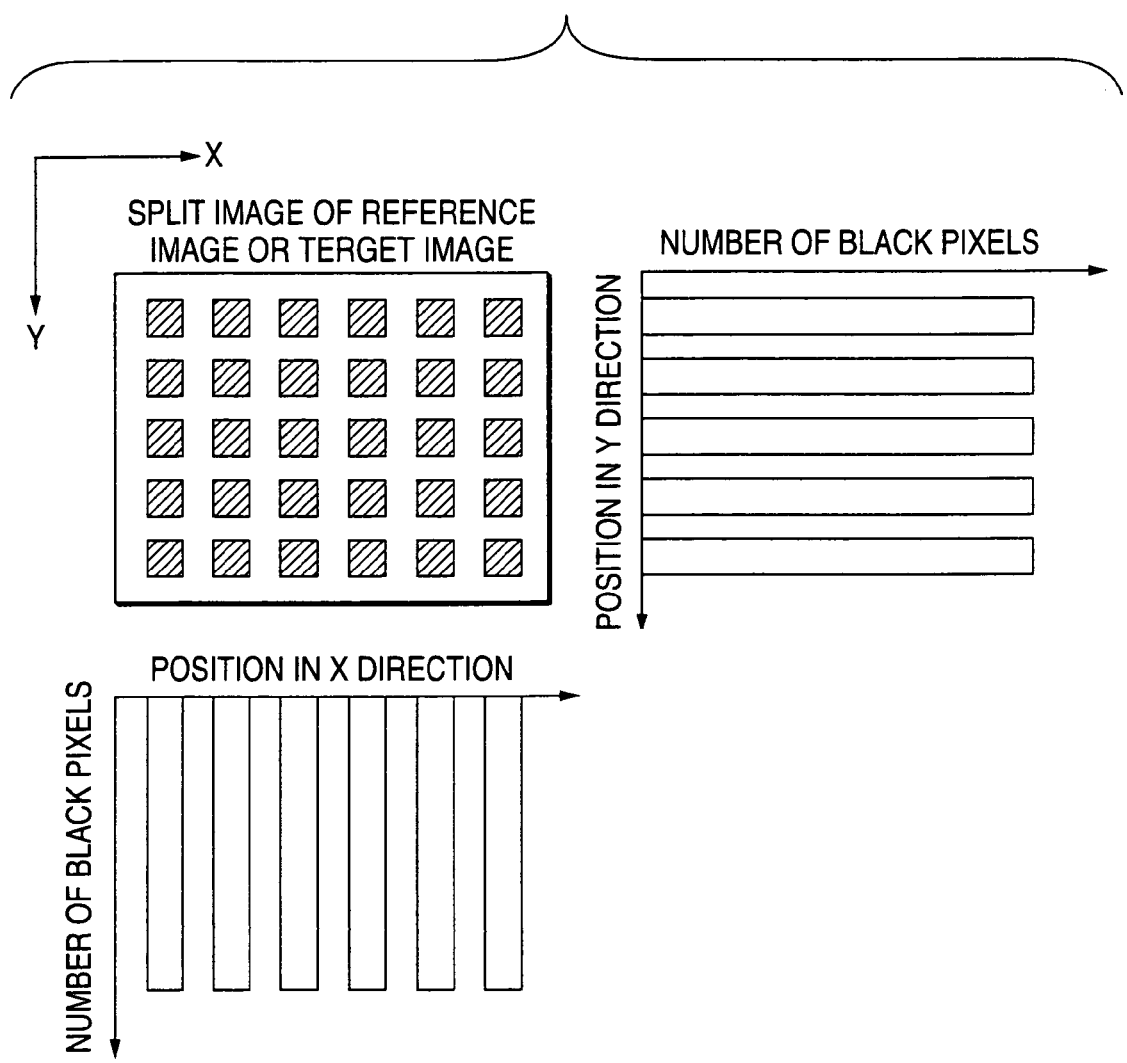
FIG. 4 is a view for explaining an example of generation of split projected waveforms.

In step S2a, the split projected waveform generation portion 22 of the projected waveform generation portion 11 generates X-direction split projected waveforms and Y-direction split projected waveforms successively for the split images generated by the step S1a. FIG. 4 is a view for explaining an example of the generation of split projected waveforms. In each X-direction split projected waveform, a distribution of black pixels in the X coordinate of a corresponding split image is expressed in the number of pixels. That is, the numbers of black pixels measured when pixels having the same X coordinate are scanned in the Y direction are arranged in accordance with X coordinates. Similarly, in each Y-direction split projected waveform, a distribution of black pixels in the Y coordinate of a corresponding split image is expressed in the number of pixels. That is, the numbers of black pixels measured when pixels having the same Y coordinate are scanned in the X direction are arranged in accordance with Y coordinates. In the case of multi-valued images, the numbers of pixels may be replaced by respective gradation values of pixels which are accumulated to generate projected waveforms. Incidentally, even in the case where one of X-direction scanning and Y-direction scanning is used, X-direction split projected waveforms and Y-direction split projected waveforms can be generated simultaneously. In this case, the split projected waveforms can be generated speedily from the split images.

In step S2b, split images generated from the target image in the step S1b are processed in the same manner as in the step S2a. Accordingly, in the processes in the steps S2a and S2b, X-direction split projected waveforms and Y-direction split projected waveforms are generated in accordance with 32 split images obtained by splitting the reference image and 32 split images obtained by splitting the target image. That is, split projected waveforms are generated as follows:

32 X-direction split projected waveforms of the reference image;

32 Y-direction split projected waveforms of the reference image;

32 X-direction split projected waveforms of the target image; and

32 Y-direction split projected waveforms of the target image.

In step S3a, the split projected waveform synthesizer portion 23 of the projected waveform generation portion 11 generates a projected waveform of a partial image larger in area than one split image generated in the step S1a by combining the split projected waveforms generated in the step S2a and connecting or adding the split projected waveforms. FIGS. 5A to 5D show an example of a process of connecting the split projected waveforms in the X direction. In this example, when the reference image shown in FIG. 5A is split into band-like regions shown in FIG. 5B, respective X-direction projected waveforms in the band-like regions are obtained. As shown in FIG. 5C, each of the band-like regions contains four split images. As shown in FIG. 5D, an X-direction split projected waveform is obtained in accordance with each split image. When the split projected waveforms are four by four connected simply, respective X-direction projected waveforms of the band-like regions can be obtained.

FIGS. 6A to 6E are explanatory views of mathematization for simplifying the description of FIGS. 5A to 5D. FIGS. 6A to 6E show the case where a one-line X-direction projected waveform is generated from four split projected waveforms in the lowermost line in FIG. 5D. FIGS. 6A to 6D show four split projected waveforms to be combined into one. Assume that four X-direction split projected waveforms generated from four split image regions arranged adjacently to one another in the X direction are $P_{x1}(x)$, $P_{x2}(x)$, $P_{x3}(x)$ and $P_{x4}(x)$ respectively.

$P_{x1}(x)$: $0 \leq x < 100$ $P_{x2}(x)$: $100 \leq x < 200$ $P_{x3}(x)$: $200 \leq x < 300$ $P_{x4}(x)$: $300 \leq x < 400$ When the four split images arranged adjacently to one another in the X direction are combined into one required image region (band-like region), the projected waveform $P_{xall}(x)$ of the required image region can be given by the following expression.

$$P_{xall}(x) = P_{x1}(x) + P_{x2}(x) + P_{x3}(x) + P_{x4}(x)$$

$0 \leq x < 400$

The connected projected waveform is shown in FIG. 6E.

FIGS. 7A to 7I are explanatory views of mathematization for simplifying an example of the process of connecting split projected waveforms in the Y direction. Similarly, four band-like regions are considered as vertically long regions in the Y direction. When Y-direction split projected waveforms obtained from eight split images contained in each band-like region are combined into one, a Y-direction projected waveform can be generated in accordance with each vertically long band-like region.

FIGS. 7A to 7H show eight split projected waveforms to be combined into one. Like the description of FIGS. 6A to 6D, assume that eight Y-direction split projected waveforms generated from eight split image regions arranged adjacently to one another in the Y direction are $P_{y1}(y)$, $P_{y2}(y)$, $P_{y3}(y)$, $P_{y4}(y)$, $P_{y5}(y)$, $P_{y6}(y)$, $P_{y7}(y)$ and $P_{y8}(y)$ respectively.

$P_{y1}(y)$: $0 \leq y < 100$ $P_{y2}(y)$: $100 \leq y < 200$ $P_{y3}(y)$: $200 \leq y < 300$ $P_{y4}(y)$: $300 \leq y < 400$ $P_{y5}(y)$: $400 \leq y < 500$ $P_{y6}(y)$: $500 \leq y < 600$ $P_{y7}(y)$: $600 \leq y < 700$ $P_{y8}(y)$: $700 \leq y < 800$ When the eight split images arranged adjacently to one another in the Y direction are combined into one required image region (band-like region), the projected waveform $P_{yall}(y)$ of the required image region can be given by the following expression.

$$P_{yall}(y) = P_{y1}(y) + P_{y2}(y) + P_{y3}(y) + P_{y4}(y) + P_{y5}(y) + P_{y6}(y) + P_{y7}(y) + P_{y8}(y)$$

$0 \leq y < 800$

Figure 7:
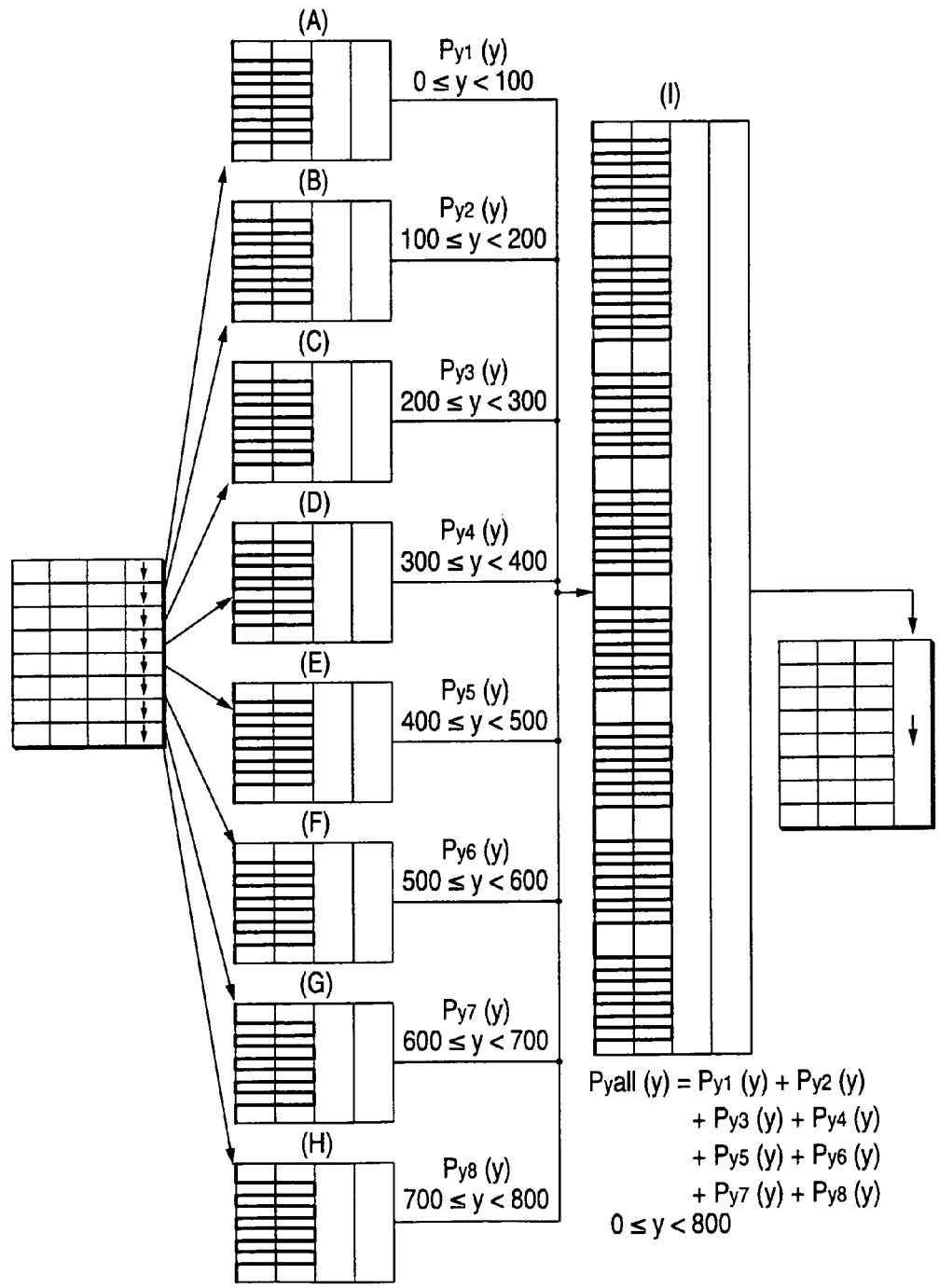
FIGS. 7A to 7I are views for explaining simple mathematization in an example of a process for combining split projected waveforms in a Y direction.

The connected projected waveform is shown in FIG. 7I.

It is apparent from the above description that when projected waveforms are generated in accordance with arbitrary image regions of an image and combined into one, a projected waveform of a required image region in a required direction can be generated.

Besides X-direction projected waveforms of the horizontally long band-like regions and Y-direction projected waveforms of the vertically long band-like regions, X- and Y-direction projected waveforms of a region larger in size than one split image can be generated. In this case, addition as well as connection may be required. Addition of split projected waveforms will be described in brief.

FIGS. 8A to 8E are views for explaining an example of a projected waveform generated by addition of X-direction split projected waveforms. Here is shown the case where one X-direction projected waveform is generated on the assumption that two split regions represented by the arrows in FIG. 8A and continuous in the Y direction are regarded as one required image region represented by the arrow in FIG. 8B.

Two X-direction split projected waveforms are generated from the two split images arranged adjacently to each other in the Y direction and are expressed as $P'_{x1}(x)$ and $P'_{x2}(x)$ respectively.

$$P'_{x1}(x): 0 \leq x < 100$$

$$P'_{x2}(x): 0 \leq x < 100$$

Figure 8A:
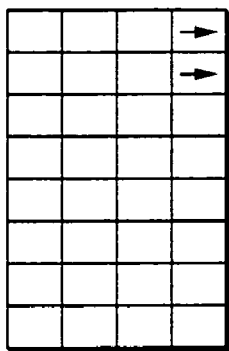
FIGS. 8A to 8E are views for explaining an example of generation of a projected waveform by addition of split projected waveforms in the X direction.
Figure 8B:
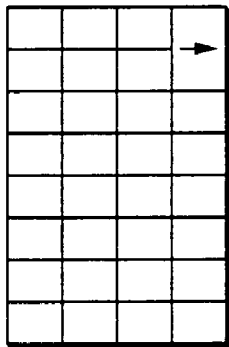
Figure 8C:
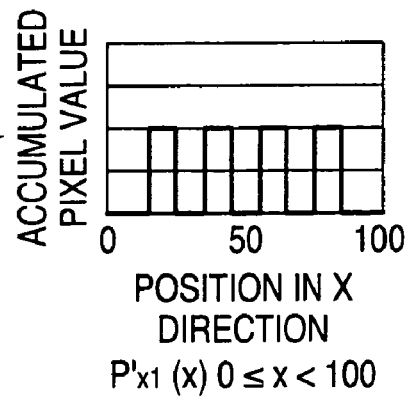
Figure 8D:
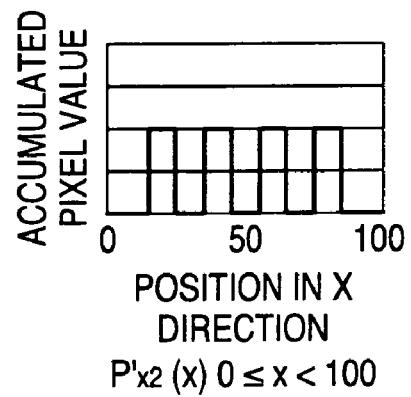

FIGS. 8C and 8D show the split projected waveforms respectively. When the two split images arranged adjacently to each other in the Y direction are regarded as one required image region, the projected waveform $P'_{xall}(x)$ of the required image region can be given by the following expression.

$$P'_{xall}(x) = P'_{x1}(x) + P'_{x2}(x)$$

$$0 \leq x < 100$$

Figure 8E:
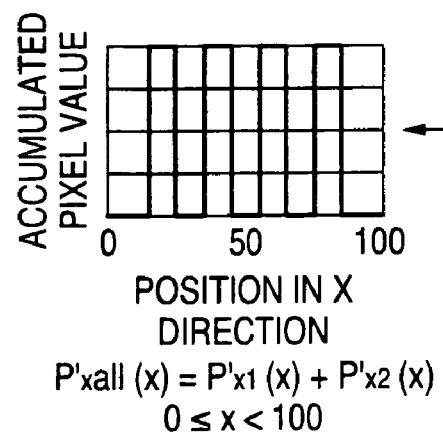

FIG. 8E shows the projected waveform obtained thus by addition.

FIGS. 9A to 9E are views for explaining an example of a projected waveform generated by addition of Y-direction split projected waveforms. Here is shown the case where one Y-direction projected waveform is generated on the assumption that two split regions represented by the arrows in FIG. 9A and continuous in the X direction are regarded as one required image region represented by the arrow in FIG. 9B.

Like the description of FIGS. 8A to 8E, two Y-direction split projected waveforms are generated from the two split images arranged adjacently to each other in the X direction and are expressed as $P'_{y1}(y)$ and $P'_{y2}(y)$ respectively.

$$P'_{y1}(y): 0 \leq y < 100$$

$$P'_{y2}(y): 0 \leq y < 100$$

Figure 9A:
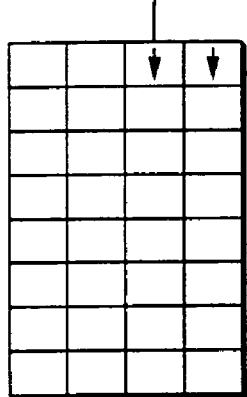
FIGS. 9A to 9E are views for explaining an example of generation of a projected waveform by addition of split projected waveforms in the Y direction.
Figure 9B:
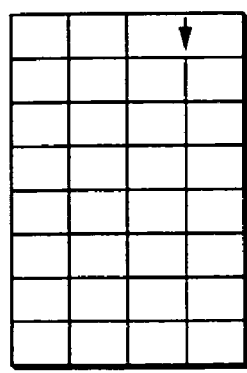
Figure 9C:
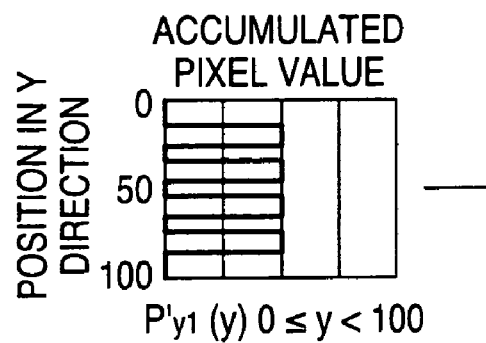
Figure 9D:
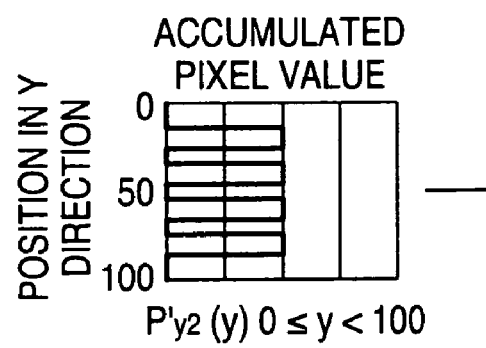

FIGS. 9C and 9D show the split projected waveforms respectively. When the two split images arranged adjacently to each other in the X direction are regarded as one required image region, the projected waveform $P'_{yall}(y)$ of the required image region can be given by the following expression.

$$P'_{yall}(y) = P'_{y1}(y) + P'_{y2}(y)$$

$$0 \leq y < 100$$

Figure 9E:
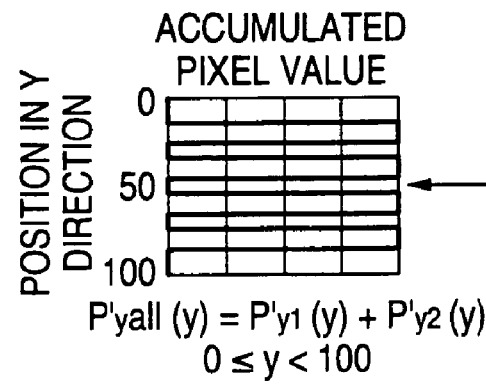

FIG. 9E shows the projected waveform obtained thus by addition.

As described above, X- and Y-direction projected waveforms of a required image region can be generated when split projected waveforms are connected or added. In the following description, split projected waveforms are combined to obtain X-direction projected waveforms of horizontally long band-like regions and Y-direction projected waveforms of vertically long band-like regions as shown in FIGS. 6A to 6E and FIGS. 7A to 7I. In this case, eight X-direction projected waveforms and four Y-direction projected waveforms can be generated.

The first reason why projected waveforms are generated by combinations of split projected waveforms is that geometrical distortion in an image is divided into parts in the X and Y directions. In this example, because geometrical distortion is divided into 4×8 parts, 32 split images are generated. The respective projected waveforms of the 32 split images are combined so that eight X-direction projected waveforms and four Y-direction projected waveforms can be generated in the aforementioned manner.

Figure 10A:
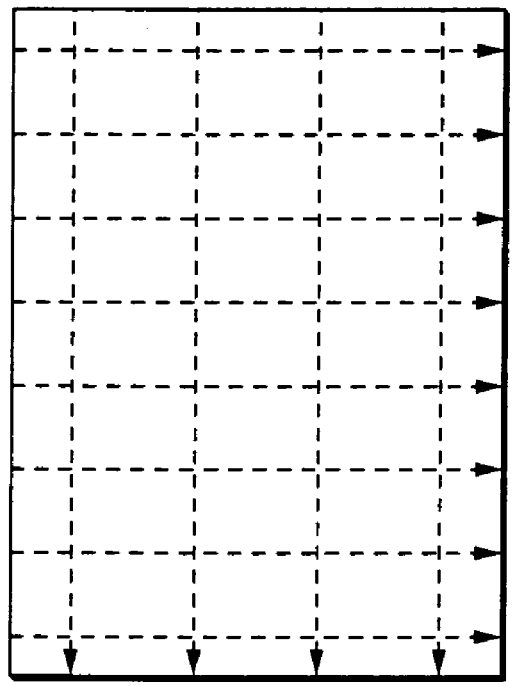
FIGS. 10A and 10B are views for explaining an example of X- and Y-direction projected waveforms obtained by a process of synthesizing split projected waveforms.
Figure 10B:
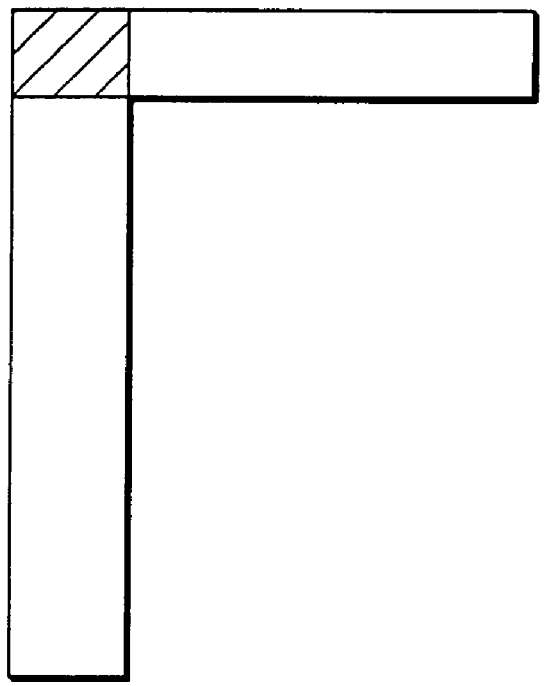

The second reason is that the quantity of calculation is reduced. It is necessary to scan the whole of an image to be generated and count pixels in order to generate projected waveforms. Because the quantity of calculation increases in proportion to the area of the image, it is necessary to minimize the quantity of calculation in order to obtain high-speed processing. FIGS. 10A and 10B are views for explaining an example of X- and Y-direction projected waveforms obtained by synthesizing of split projected waveforms. X-direction projected waveforms of horizontally long band-like regions and Y-direction projected waveforms of vertically long band-like regions are obtained in accordance with band-like regions in directions represented by the broken lines in FIG. 10A. On this occasion, a horizontally long band-like region and a vertically long band-like region overlap each other at the hatched portion as shown in FIG. 10B. When split projected waveforms are to be obtained in accordance with split images as described above, duplication of scanning can be prevented because the split projected waveform of the hatched overlap portion can be obtained by one image scanning step. Because duplication of scanning for all split regions can be prevented in the aforementioned manner, the quantity of calculation required for generating projected waveforms can be reduced by half.

In step S3b, the split projected waveforms generated in the step S2b are processed in the same manner as in the step S3a. Accordingly, the synthesizing processes in the steps S3a and S3b collect the split projected waveforms into the following projected waveforms:

eight X-direction projected waveforms of the reference image;

four Y-direction projected waveforms of the reference image;

eight X-direction projected waveforms of the target image; and four Y-direction projected waveforms of the target image.

Figure 11:
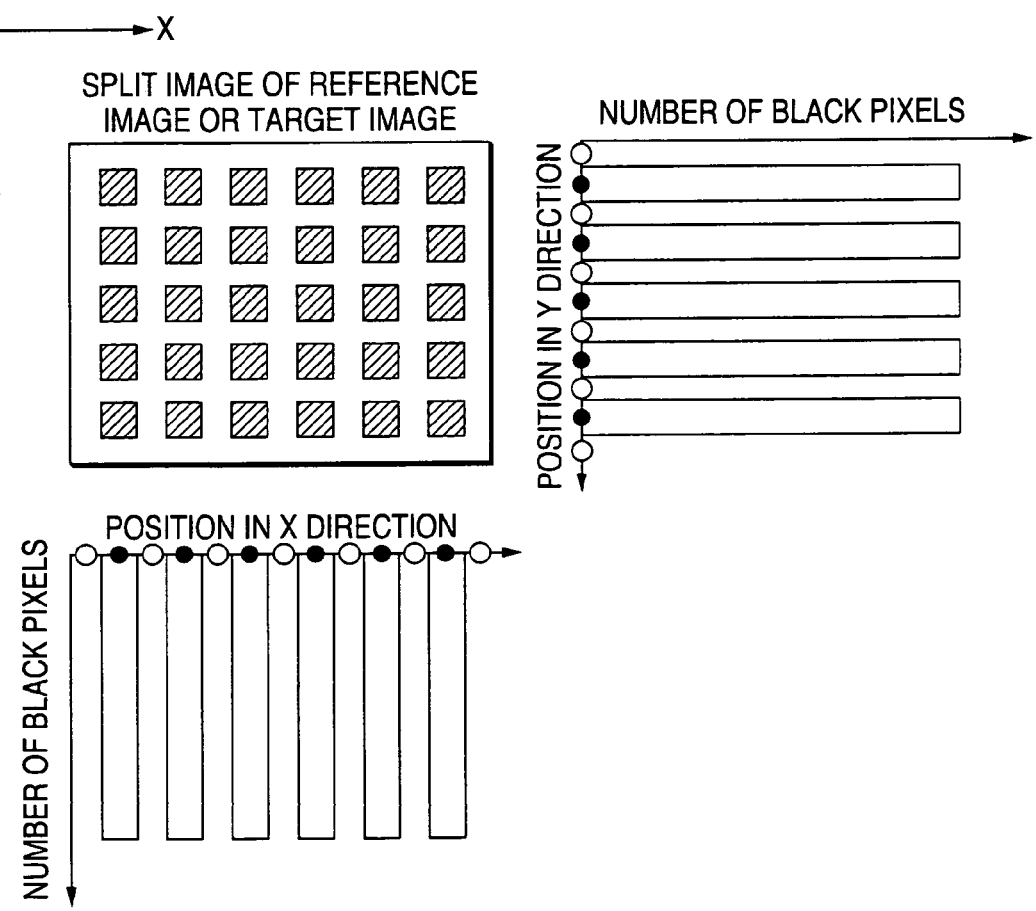
FIG. 11 is a view for explaining an example of a process for extracting feature volumes.

In step S4a, the feature volume extraction portion 12 extracts feature volumes from the X- and Y-direction projected waveforms generated in the step S3a and generates feature volume data successively. FIG. 11 is a view for explaining an example of a feature volume extraction process. The feature volumes to be extracted are not particularly limited. For example, the feature volumes may be positive and negative peaks (such as peaks, troughs, or peaks and troughs) of the projected waveforms or may be edges extracted from the projected waveforms by a differential filter or the like. Further, the feature volumes may be arbitrary frequency components or may be arbitrary inclinations. In the example shown in FIG. 11, peaks of the projected waveforms are used as the feature volumes. Peaks (illustrated as white dots) and troughs (illustrated as black dots) are shown in FIG. 11. In the following description, peaks (illustrated as white dots) of the projected waveforms are used as the feature volumes, and positions of the peaks on the projected waveforms are used as the feature volume data. Although accuracy of collation can be improved when peaks and troughs are used as the feature volumes, the case where only peaks are used as the feature volumes will be described below for the sake of simplification of the description.

In step S4b, the projected waveforms generated in the step S3b are processed in the same manner as in the step S4a. Accordingly, the feature volume extraction processes in the steps S4a and S4b generate the following feature volume data:

X-direction feature volume data (eight series) of the reference image;

Y-direction feature volume data (four series) of the reference image;

X-direction feature volume data (eight series) of the target image; and

Y-direction feature volume data (four series) of the target image.

Incidentally, an array of feature volume data obtained from one projected waveform is expressed as a series.

In step S5, the feature volume correlation portion 13 correlates the feature volume data of the reference image obtained in the step S4a with the feature volume data of the target image obtained in the step S4b. Specifically, feature volume element data are correlated with each other in accordance with the series so that elements of the X-direction feature volume data of the reference image obtained in the step S4a and elements of the X-direction feature volume data of the target image obtained in the step S4b are correlated with each other and elements of the Y-direction feature volume data of the reference image obtained in the step S4a and elements of the Y-direction feature volume data of the target image obtained in the step S4b are correlated with each other. For example, DP matching can be used as a method for correlating the feature volume element data.

Figure 12:
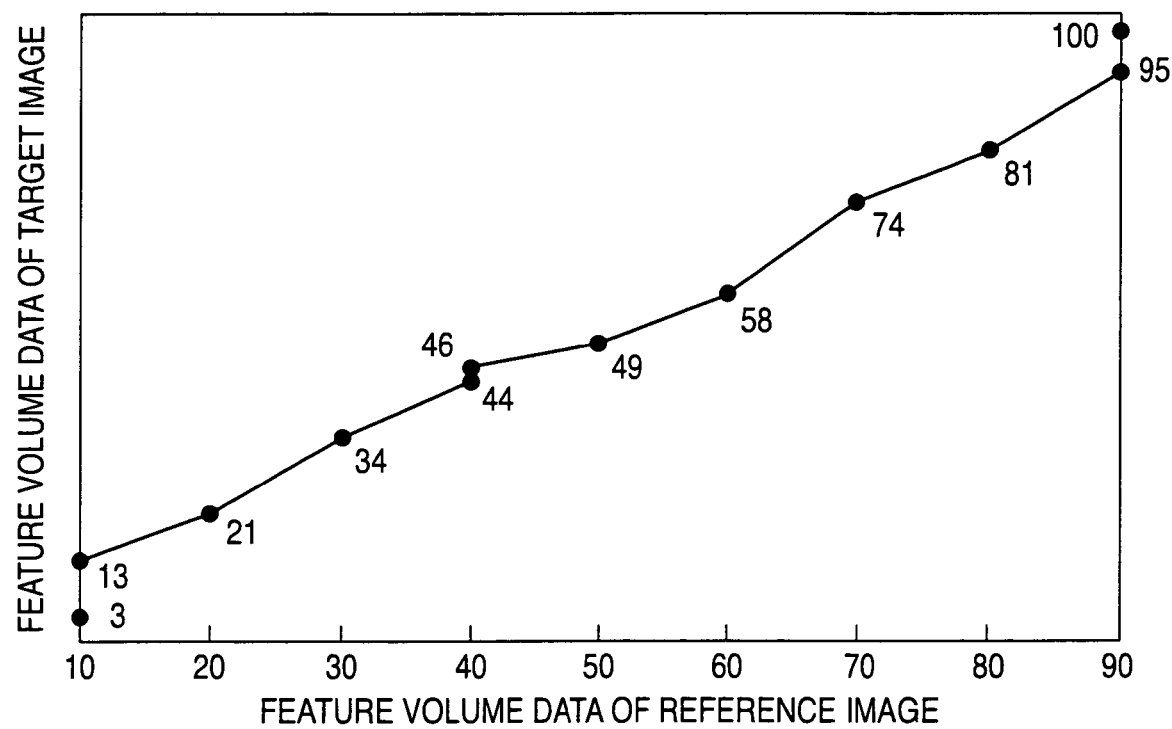
FIG. 12 is a graph for explaining an example of correlation between feature volume data on the basis of DP matching.

FIG. 12 is a graph for explaining an example of correlation of feature volume data by DP matching. FIG. 12 shows the case, as a specific example, where the X-direction feature volume data of the reference image obtained in the step S4a are {10, 20, 30, 40, 50, 60, 70, 80, 90} while the X-direction feature volume data of the target image obtained in the step S4b are {3, 13, 21, 34, 44, 46, 49, 58, 74, 81, 95, 100}. In this example, the feature volume data {3, 46, 100} of the target image are false peaks caused by stain on printed matter, that is, image noises. Elements to be correlated with the peak data of the reference image are {13, 21, 34, 44, 49, 58, 74, 81, 95}. When DP matching is used, accurate correlation can be made without influence of false peaks as shown in FIG. 12.

Figures 13, 14:
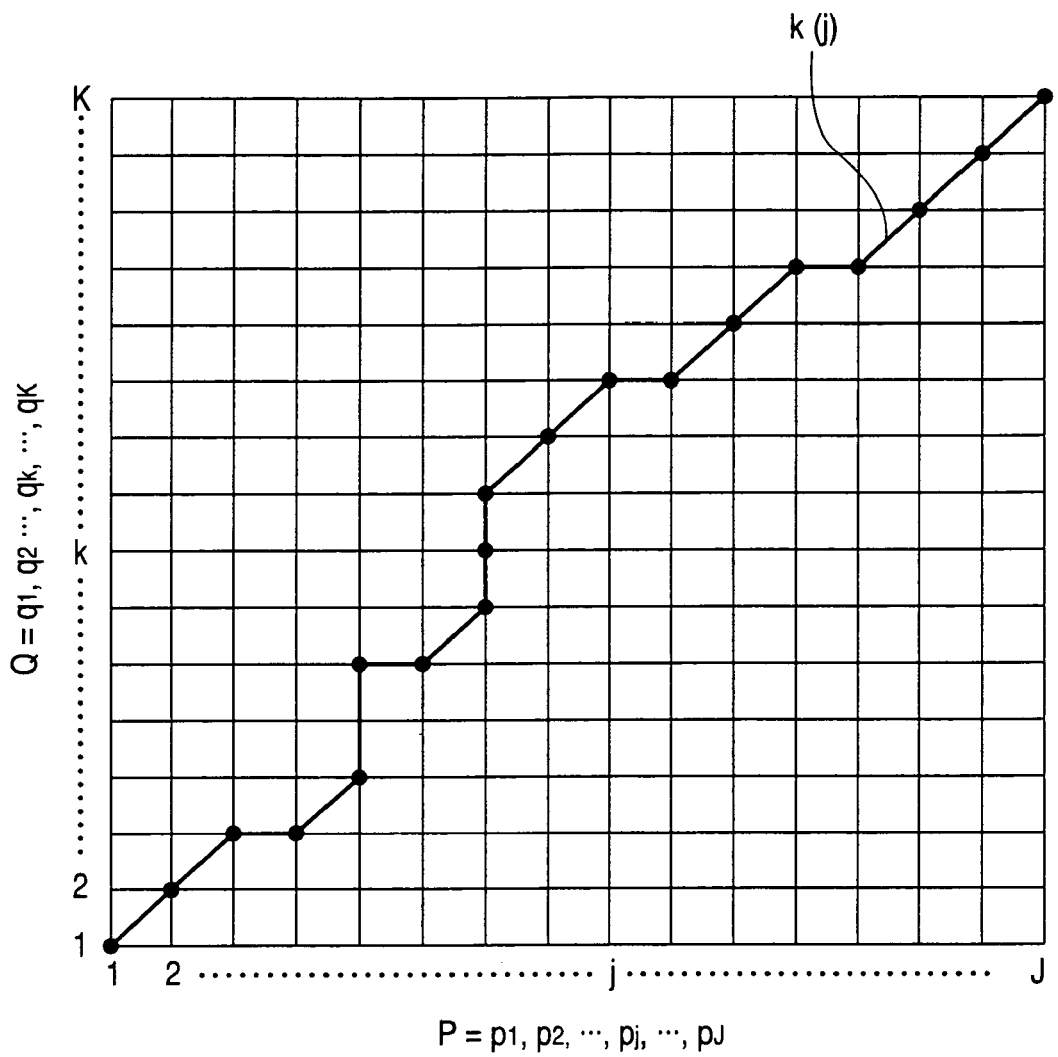
FIG. 13 is a grid pattern graph for explaining general DP matching.
FIG. 14 is a view for explaining a specific example of a result of correlation between feature volume data.

DP matching, which is generally used, will be described below in brief. FIG. 13 is a grid pattern graph for explaining general DP matching. Assume now that feature volume data P of the reference image and feature volume data Q of the target image are given as follows.

$$P = p_1, p_2, \ldots, p_j, \ldots, p_J$$

$$Q = q_1, q_2, \ldots, q_k, \ldots, q_K$$

Then, similarity (or distance) D(P, Q) can be given as follows.

$$D(P, Q) = \min_{k(j)} [\Sigma_{j=1}^J h(j, k)]$$

The condition of k(j) is given as follows.
1: k(j) is a continuous function of j.
2: k(j) is a monotone increasing function of j.
3: k(1)=1, k(J)=K Partial similarity (or distance) h(j, k) at a position (j, k) on a P-Q plane is given as follows.

$$h(j, k) = \min [h(j-1, k-1) + 2d(j, k), h(j-1, k) + d(j, k), h(j, k-1) + d(j, k)]$$

in which $d(j, k) = \|p_j - q_k\|$

When a path that gives D(P, Q) is obtained, feature volume data $P = p_1, p_2, \ldots, p_j, \ldots, p_J$ of the reference image can be correlated with feature volume data $Q = q_1, q_2, \ldots, q_k, \ldots, q_K$ of the target image. An example of the path obtained in this manner is shown in FIG. 13. Although FIG. 13 shows a general example, FIG. 12 shows a path obtained from a specific example of feature volume data of the reference image and feature volume data of the target image as described above.

FIG. 14 is a view for explaining a specific example of a result of correlation of feature volume data. When feature volume data of the reference image and feature volume data of the target image are correlated with each other by DP matching in the aforementioned manner, a result of correlation as shown in FIG. 14 can be obtained. As described above, X-direction feature volume data {13, 21, 34, 44, 49, 58, 74, 81, 95} of the target image are correlated with X-direction feature volume data {10, 20, 30, 40, 50, 60, 70, 80, 90} of the reference image.

Such correlation between feature volume data is obtained for respective series of feature volume data in the X direction. Feature volume data in the Y direction are processed in the same manner. Accordingly, in step S5, feature volume correlation data are generated as follows.

X-direction feature volume correlation data (8 series)
Y-direction feature volume correlation data (4 series)

Although the aforementioned example has described on the case where only peaks among positive and negative peaks are used as feature volumes, feature volume data of corresponding peaks and feature volume data of corresponding troughs may be interpolated when, for example, peaks and troughs are used as feature volumes. When, for example, X-direction feature volume correlation data (peaks) of the reference image and X-direction feature volume correlation data (troughs) of the reference image are interpolated, X-direction feature volume correlation data (peaks and troughs) of the reference image can be generated. Accordingly, feature volume correlation data are collectively generated as follows.

X-direction feature volume correlation data (peaks and troughs) (8 series)
Y-direction feature volume correlation data (peaks and troughs) (4 series)

If the system shown in the aforementioned example is a low-noise system in which false peaks are hardly produced, elements of feature volume data of the target image may be correlated with elements of feature volume data of the reference image successively without use of DP matching.

In step S6, the correction value calculation portion 14 generates at least one geometrical distortion correcting lookup table from the feature volume correlation data of the reference image and the feature volume correlation data of the target image obtained in the step S5. The number of generated lookup tables is at least one. In this example, two lookup tables are generated as follows.

"Forward lookup table" constituted by coordinates of the target image corresponding to coordinates of the reference image; and "Backward lookup table" constituted by coordinates of the reference image corresponding to coordinates of the target image.

FIGS. 15A and 15B are views for explaining an example of a process for generating a forward lookup table from X-direction feature volume correlation data. FIG. 16 is a view for explaining an example of the generated lookup table. First, correction values required for generating each lookup table are decided. Distortion correction values required for generating a forward lookup table can be calculated as (elements of X-direction feature volume data of the target image – elements of X-direction feature volume data of the reference image) between corresponding data elements of feature volume correlation data. That is, correction values as shown in FIG. 15A are calculated from feature volume correlation data shown in FIG. 14. Incidentally, correction values of a backward lookup table can be easily generated when the signs of distortion correction values for generating the forward lookup table are inverted.

Figures 17, 18A, 18B:
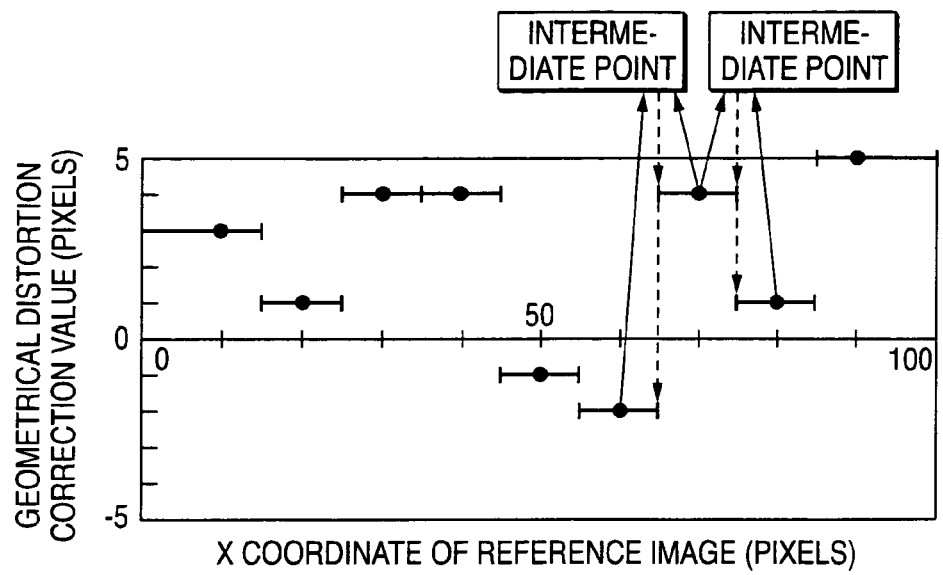
FIG. 17 is a graph for explaining an example of the relation between coordinates of feature volume data and correction regions.
FIGS. 18A and 18B are views for explaining another example of the relation between coordinates of feature volume data and correction regions.

Although correction values on X coordinates having feature volume data have been already calculated, correction values on other X coordinates have been not decided yet. Therefore, correction values on other X coordinates on which correction values have been not decided yet are calculated now. FIG. 17 is a graph for explaining an example of the relation between coordinates of feature volume data and correction regions. In FIG. 17, the black dots express correction values on X coordinates having feature volume data. In the example shown in FIGS. 15A and 15B, each correction value is applied while middle points between adjacent elements of feature volume data are regarded as start and end points as shown in FIG. 15B. This can be graphed as shown in FIG. 17. In FIG. 17, a line segment which extends left and right from a feature volume data expressed by each black dot expresses a coordinate range to which a correction value corresponding to the feature volume data is applied. For example, a correction value "−1" is applied to an X coordinate range "46 to 55" of the reference image. Accordingly, an X coordinate range of the target image corresponding to the X coordinate range "46 to 55" of the reference image is "45 to 54". FIG. 16 shows the forward lookup table obtained in this manner. Incidentally, the backward lookup table can be generated in the same manner.

FIGS. 18A and 18B are views for explaining another example of the relation between coordinates of feature volume data and correction ranges. FIG. 19 is a view for explaining another example of the generated lookup table. In the example shown in FIGS. 18A, 18B and 19, correction values for feature volume data are calculated as shown in FIG. 18A in the same manner as in FIGS. 15A, 15B and 16. Then, an average of the correction values is calculated as shown in FIG. 18B. The average is used as a correction value on the whole. FIG. 19 shows the forward lookup table obtained by use of the average correction value. The backward lookup table can be generated in the same manner.

Although this example has been described on the case where forward and backward lookup tables are generated from one series of feature volume data in the X direction, lookup tables may be generated from other series of feature volume data in the same manner. With respect to the Y direction, forward and backward lookup tables are generated in the same manner. Accordingly, in the step S6, lookup tables are generated as follows.

X-direction forward lookup tables (8 series)
    Y-direction forward lookup tables (4 series)
    X-direction backward lookup tables (8 series)
    Y-direction backward lookup tables (4 series)

In step S7, interpolation is carried out on the group of lookup tables generated in the step S6 to thereby generate a group of extended lookup tables. FIGS. 20A to 20C are views for explaining an example of a process for generating an interpolated lookup table. The group of lookup tables generated in the step S6 roughly reflect geometrical distortion characteristic but are insufficient to obtain higher accurate image collation. Therefore, in the step S7, an interpolated lookup table is generated in order to improve image collation accuracy.

FIG. 20A shows geometrical distortion correction values obtained in the same manner as in FIG. 15A or 18A. These geometrical distortion correction values can be graphed as shown in FIG. 20B. Interpolation is carried out on the basis of correction values on X coordinates having feature volume data to thereby calculate correction values on X coordinates between the X coordinates having feature volume data. That is, correction values on X coordinates are calculated as represented by black dots in FIG. 20C, so that an interpolated lookup table is generated. Incidentally, the correction values are discrete because the distortion correction values correspond to pixels on a computer. Further, a backward interpolated lookup table can be generated in the same manner.

Incidentally, if the group of lookup tables generated in the step S6 can endure to be put into practical use, the process of generating interpolated lookup tables in the step S7 may be dispensed with. Interpolated lookup tables need not be generated for all the group of lookup tables generated in the step S6.

Figures 21A, 21B:
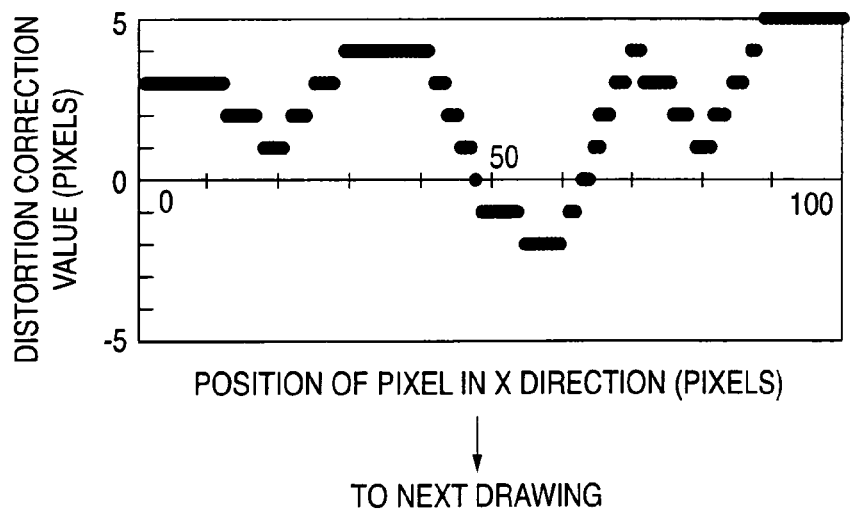
FIGS. 21A and 21B are views for explaining an example of a process for generating an X-direction forward interpolated lookup table.

FIGS. 21A and 21B are views for explaining an example of a process for generating an X-direction forward interpolated lookup table. FIG. 22 is a view for explaining an example of the X-direction forward interpolated lookup table generated thus. As described above, interpolation as shown in FIG. 21B is carried out on the basis of a result of correlation between feature volume data and correction values shown in FIG. 21A, so that an interpolated lookup table can be generated as shown in FIG. 22.

Interpolation is carried out on lookup tables of required series among the group of lookup tables generated in the step S6, so that interpolated lookup tables are generated in the aforementioned manner. If interpolated lookup tables are generated for all the group of lookup tables generated in the step S6, interpolated lookup tables are generated as follows.

X-direction forward interpolated lookup tables (8 series)
    Y-direction forward interpolated lookup tables (4 series)
    X-direction backward interpolated lookup tables (8 series)
    Y-direction backward interpolated lookup tables (4 series)

Incidentally, a set of lookup tables or interpolated lookup tables generated in the aforementioned steps is equivalent to the lookup table 15 shown in FIG. 1.

Besides the lookup tables generated by the method shown in FIGS. 15A, 15B and 16 or FIGS. 18A, 18B and 19 or the interpolated lookup tables generated by the method shown in FIGS. 21A, 21B and 22, n-dimensional lookup tables can be generated from a result of correlation between feature volume data and correction values by various methods. FIGS. 23A to 23D are views for explaining a general form of one-dimensional lookup tables. FIGS. 23A and 23B show a generalized structure of forward one-dimensional lookup tables. FIGS. 23C and 23D show a generalized structure of backward one-dimensional lookup tables. Incidentally, in this example, the reference image has a size of M pixels in the X direction by N pixels in the Y direction whereas the target image has a size of I pixels in the X direction by J pixels in the Y direction.

First, attention is paid to the forward one-dimensional lookup tables shown in FIGS. 23A and 23B. Assuming that the coordinates of any objective pixel in the reference image are $(X_m, Y_m)$, then the size of the reference image which is the size of M pixels in the X direction by N pixels in the Y direction can be given as follows.

$$0 \leq m \leq M-1$$

$$0 \leq n \leq N-1$$

Assuming that forward geometrical distortion correction values in the X and Y directions are $(S_X, S_Y)$, then the coordinates of a reference pixel of the target image corresponding to the objective pixel of the reference image can be given by the following expression.

$$(X_m + S_X, Y_n + S_Y)$$

Because the correction values $(S_X, S_Y)$ may be constant or may be functions of $X_m$ and $Y_n$ respectively, the correction values $(S_X, S_Y)$ can be given as follows.

$$S_X = \text{constant or } S_X = f(X_m)$$

$$S_Y = \text{constant or } S_Y = f(X_n)$$

On the other hand, because the target image has a size of I pixels in the X direction by J pixels in the Y direction, the following constraint condition can be given.

$$0 \leq X_m + S_X \leq I-1$$

$0 \leq Y_n + S_Y \leq J-1$

In the aforementioned condition, an X-direction forward one-dimensional lookup table (size: M) and a Y-direction forward one-dimensional lookup table (size: N) can be generated. When these forward one-dimensional lookup tables are used, the X and Y coordinates of the reference pixel in the target image corresponding to the arbitrary objective pixel in the reference image can be referred to independently of each other. The coordinates of the reference pixel in the target image are used as coordinates after correction of geometrical distortion.

Backward one-dimensional lookup tables can be generated in the same manner. That is, assuming that the coordinates of any objective pixel in the target image are $(X'_i, X'_j)$, then the size of the target image which is the size of I pixels in the X direction by J pixels in the Y direction can be given as follows.

$0 \leq i \leq I-1$ $0 \leq j \leq J-1$

Assuming that backward geometrical distortion correction values in the X and Y directions are $(S'_X, S'_Y)$, then the coordinates of a reference pixel of the reference image corresponding to the objective pixel of the target image can be given by the following expression.

$(X'_i + S'_X, Y'_j + S'_Y)$

Because the correction values $(S'_X, S'_Y)$ may be constant or may be functions of $X'_i$ and $Y'_j$ respectively, the correction values $(S'_X, S'_Y)$ can be given as follows.

$S'_X$=constant or $S'_X=f(X'_i)$ $S'_Y$=constant or $S'_Y=f(X'_j)$

On the other hand, because the reference image has a size of M pixels in the X direction by N pixels in the Y direction, the following constraint condition can be given.

$0 \leq X'_i + S'_X \leq M-1$ $0 \leq Y'_j + S'_Y \leq N-1$

In the aforementioned condition, an X-direction backward one-dimensional lookup table (size: I) and a Y-direction backward one-dimensional lookup table (size: J) can be generated. When these backward one-dimensional lookup tables are used, the X and Y coordinates of the reference pixel in the reference image corresponding to the arbitrary objective pixel in the target image can be referred to independently of each other. The coordinates of the reference pixel in the reference image are used as coordinates after correction of geometrical distortion.

FIGS. 24 and 25 are views for explaining a general form of two-dimensional lookup tables. FIG. 24 shows a general form of a forward two-dimensional lookup table. FIG. 25 shows a general form of a backward two-dimensional lookup table. Elements of the two-dimensional lookup tables are generated in the same manner as described in FIGS. 23A to 23D. In the one-dimensional lookup tables, X and Y coordinates are referred to independently of each other. On the contrary, in the two-dimensional lookup tables, X and Y coordinates are referred to simultaneously. That is, the forward two-dimensional lookup table is generated so that all pixels of the reference image are correlated with reference destinations of the target image. The number of elements in the forward two-dimensional lookup table is M×N. On the other hand, the backward two-dimensional lookup table is generated so that all pixels of the target image are correlated with reference destinations of the reference image. The number of elements in the backward two-dimensional lookup table is I×J.

As described above, the lookup tables are not limited to one-dimensional lookup tables and may be two-dimensional lookup tables. Accordingly, the lookup table 15 inclusive of these lookup tables can be achieved by n-dimensional lookup tables.

In step S8, the image collation portion 16 performs pattern matching by using all the group of interpolated lookup tables generated in the step S7 or all the group of lookup tables generated in the step S6 or n-dimensional lookup tables as combination of these lookup tables. Any suitable method can be used for the pattern matching. Incidentally, specific pattern matching methods will be described later in applied examples.

As described above, in the embodiment of the image processing apparatus and the image processing method according to the invention, projected waveforms are generated from the reference image and the target image. Feature volumes are extracted from the projected waveforms. A lookup table for correcting geometrical distortion is generated on the basis of correlation between the feature volumes. Accordingly, accurate and speedy image collation can be performed without influence of uneven geometrical distortion (such as positional displacement or scaling up/down) of the target image with respect to the reference image and image quality defects (such as whitening or staining).

Figure 26:
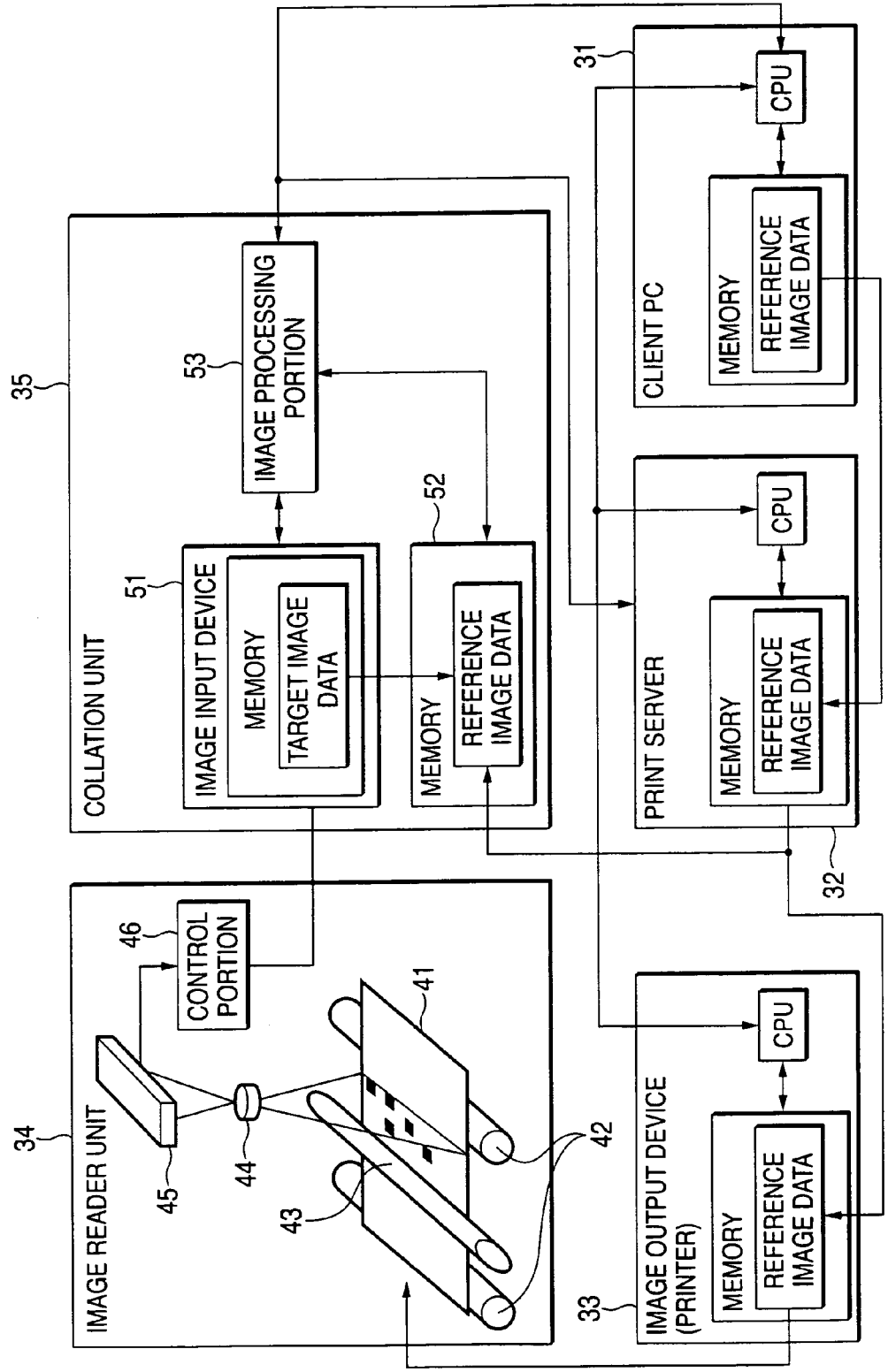
FIG. 26 is a configuration diagram showing an embodiment for carrying out a printed matter inspection apparatus and a printed matter inspection method according to the invention.

The image processing apparatus and the image processing method according to the invention can be applied to various inspection apparatuses and inspection methods. The case where the image processing apparatus according to the invention is applied to inspection of printed matter will be described below as an applied example. FIG. 26 is a configuration diagram showing an embodiment of a printed matter inspection apparatus and a printed matter inspection method according to the invention. In FIG. 26, the reference numeral 31 designates a client PC; 32, a print server; 33, an image output device; 34, an image reader unit; 35, a collation unit; 41, printed matter; 42, paper feed rollers; 43, a lamp; 44, a lens; 45, a CCD; 46, a control portion; 51, an image input portion; 52, a memory; and 53, an image processing portion.

In the configuration shown in FIG. 26, a document generated by the client PC 31 is printed by the image output device 33 such as a printer via the print server 32, so that printed matter is produced. The printed matter is transported by the paper feed rollers 42 in the image reader unit 34. The printed matter is illuminated with the lamp 43 in the middle of transport, so that an image on the printed matter 41 is focused on the 2-line CCD 45 through the lens 44. The image focused on the CCD 45 is read in accordance with the control of the control portion 46 and sent as a target image which is a subject of inspection to the collation unit 35.

On the other hand, the document generated by the client PC 31 is sent as a reference image to the collation unit 35 via the print server 32. In the collation unit 35, the reference image received via the print server 32 is stored in the memory 52. Further, the target image sent from the image reader unit 34 to the collation unit 35 in the aforementioned manner is received by the image input portion 51. The image processing portion 53 is formed to achieve the image processing apparatus or the image processing method according to the invention. The image processing portion 53 performs pattern matching between the reference image and the target image to examine the presence/absence of image quality defects in the printed matter to thereby check the quality of the printed matter.

When the collation unit 35 performs inspection and makes a decision that there is some image quality defect in the printed matter 41, an error code is sent to the print server 32. Upon reception of the error code, the print server 32 performs an error control procedure defined by a user in advance, such as a procedure of stopping the image output device 33 or a procedure of instructing the image output device 33 to re-print the document having the image quality defect, and then sends a message of print error to the client PC 31.

The respective portions will be described below in detail. The client PC 31 is a general purpose computer which performs various kinds of processing such as generation or edition of a document. When the client PC 31 issues a command to print a document, the document is sent as reference image data to the print server 32.

Upon reception of the reference image data from the client PC 31, the print server 32 performs various kinds of processing on the reference image data and sends the reference image data to the image output device 33. The print server 32 further sends the reference image data to the collation unit 35. In addition, the print server 32 performs job management for the image output device 33.

Upon reception of the reference image data processed by the print server 32, the image output device 33 prints an image on a sheet of paper and outputs the sheet of paper as printed matter 41. For example, the image output device 33 can be formed as a xerographic printer with 600 dpi and mono-chrome 256 gradations. It is matter of course that functions such as recording method, resolution, monochrome/color, etc. can be selected at option. Any paper size such as A4-size or B4-size can be selected.

The image reader unit 34 makes the 2-line CCD 45 read speedily the printed matter 41 output from the image output device 33, generates target image data and sends the target image data to the collation unit 35. Any known configuration can be applied to the image reader unit. For example, a configuration described in Japanese Patent Laid-Open No. 2000-84397 can be used.

The collation unit 35 can be constituted by a general purpose computer. The reference image received from the print server 32 is stored in the memory 52. The target image received from the image reader unit 34 is stored in a memory inside the image input portion 51. The image processing portion 53 performs collation/inspection between the reference image and the target image and sends a result of collation/inspection to the print server 32 and the client PC 31.

In this configuration, geometrical distortion such as uneven positional displacement or scaling up/down occurs because the target image is affected by the change characteristic of the paper transport speed of the paper feed rollers 42, the optical distortion characteristic of the lens 44, etc. When the image processing apparatus and the image processing method according to the invention are applied to the image processing portion 53 to generate lookup tables for correcting the geometrical distortion, the geometrical distortion can be appropriately corrected in accordance with the characteristics of the paper transport system and the optical system so that improvement in image collation accuracy can be attained.

Figure 27A:
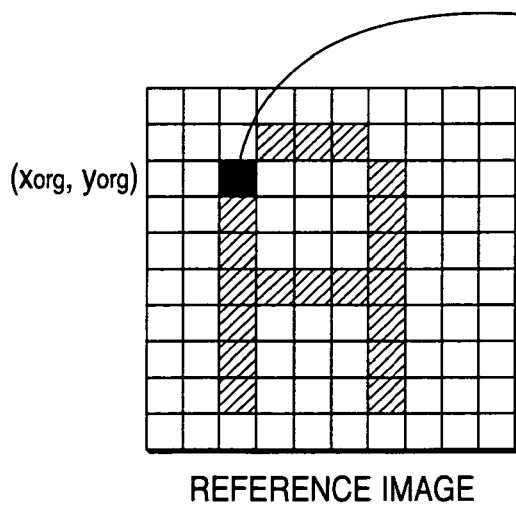
FIGS. 27A to 27C are graphs for explaining an example of a pattern matching method in the case where whitening on printed matter is detected.
Figure 27B:
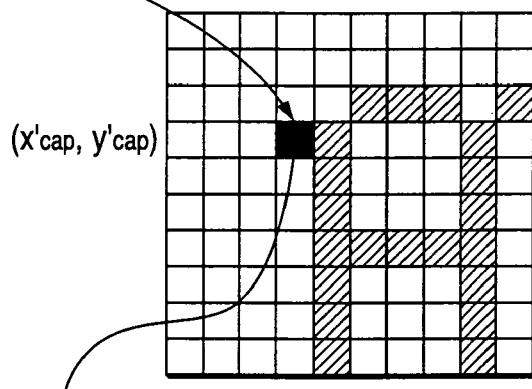
Figure 27C:
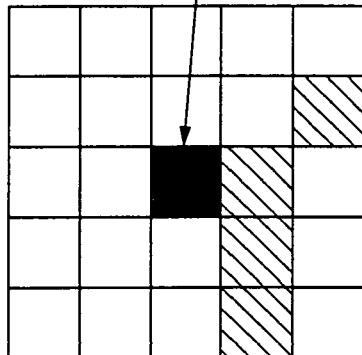

For example, a method described in Japanese Patent Application No. 2001-385876 can be adapted to a collation (pattern matching) method used in the image processing portion 53 for inspection of printed matter. FIGS. 27A to 27C are views for explaining an example of the pattern matching method in the case where whitening on printed matter is detected. FIG. 27A shows the reference image. FIG. 27B shows the target image. Incidentally, FIGS. 27A and 27B partially show the reference image and the target image respectively for the sake of convenience of description.

The term "whitening on printed matter" means a defect in which an image-forming pixel in an electronic original image is not formed (printed) on printed matter. In other words, it means a state in which a black pixel on the reference image becomes a white pixel on the target image.

When a pixel $(x'_{cap}, y'_{cap})$ on the target image corresponds to any black pixel $(x_{org}, y_{org})$ on the reference image on the basis of a pertinent forward lookup table, the pixel $(x'_{cap}, y'_{cap})$ is regarded as an objective pixel. The pertinent forward lookup table is one of all forward lookup tables and generated from the split image containing the pixel $(x_{org}, y_{org})$ by the aforementioned procedure.

When there is some black pixel in a region (5 pixels×5 pixels, 24 ambient points) around the objective pixel on the target image, a decision is made that the black pixel $(x_{org}, y_{org})$ on the reference image is not a whitened pixel. On the contrary, when there is no black pixel in the 24 ambient points, a decision is made that the black pixel $(x_{org}, y_{org})$ on the reference image is a whitened pixel. In the example shown in FIGS. 27A to 27C, a decision can be made that the black pixel is not a whitened pixel because there is some black pixel in the 24 ambient points around the objective pixel $(x'_{cap}, y'_{cap})$ on the target image as enlargedly shown in FIG. 27C.

Such processing is applied to all black pixels in the reference image successively to thereby obtain the total number of whitened pixels. Whitening may be finally judged on the basis of comparison between a threshold value and a statistical value such as the total number of whitened pixels or the ratio of the total number of whitened pixels to the total number of black pixels. Or a differential image maybe generated so that whitening can be finally judged on the basis of comparison between a whitened area and a threshold value.

Figure 28A:
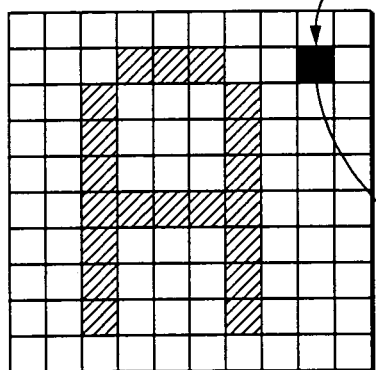
FIGS. 28A to 28C are graphs for explaining an example of the pattern matching method in the case where staining on printed matter is detected.
Figure 28B:
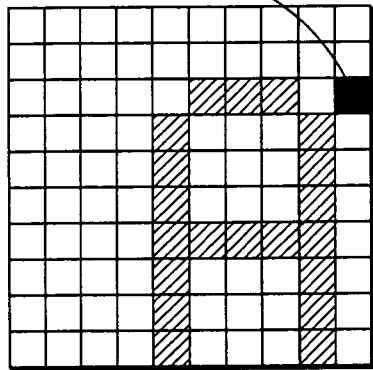
Figure 28C:
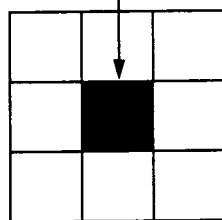

FIGS. 28A to 28C are views for explaining an example of the pattern matching method in the case where staining on printed matter is detected. FIG. 28A shows the reference image. FIG. 28B shows the target image. Incidentally, FIGS. 28A and 28B partially show the reference image and the target image respectively for the sake of convenience of description. The reference image and the target image are binary (two-valued) images.

The term "staining on printed matter" means a defect in which a pixel for forming printed matter is a non-image-forming pixel on the electronic original image. In other words, it means a state in which a black pixel on the target image is changed into a white pixel on the reference image.

When a pixel $(x''_{2org}, y''_{2org})$ on the reference image corresponds to any black pixel $(x_{2cap}, y_{2cap})$ on the target image on the basis of a pertinent backward lookup table, the pixel $(x''_{2org}, y''_{2org})$ is regarded as an objective pixel. The pertinent backward lookup table is one of all backward lookup tables and generated from the split image containing the pixel $(x_{2cap}, y_{2cap})$ by the aforementioned procedure.

When there is some black pixel in a region (3 pixels×3 pixels, 8 ambient points) around the objective pixel $(x''_{2org}, y''_{2org})$ on the reference image, a decision is made that the black pixel $(x_{2cap}, y_{2cap})$ on the target image is not a stained pixel. On the contrary, when there is no black pixel in the 8 ambient points, a decision is made that the black pixel $(x_{2cap}, y_{2cap})$ on the target image is a stained pixel. In the example shown in FIGS. 28A to 28C, a decision can be made that the black pixel is a stained pixel because there is no black pixel in the 8 ambient points around the objective pixel $(x''_{2org}, y''_{2org})$ as enlargedly shown in FIG. 28C.

Such processing is applied to all black pixels in the target image successively to thereby obtain the total number of stained pixels. Staining may be finally judged on the basis of comparison between a threshold value and a statistical value such as the total number of stained pixels or the ratio of the total number of stained pixels to the total number of white pixels. Or a differential image may be generated so that staining can be finally judged on the basis of comparison between a stained area and a threshold value.

As described above, in the embodiment of the image processing apparatus and the image processing method according to the invention, accurate and speedy image collation can be performed without influence of uneven geometrical distortion (such as positional displacement or scaling up/down) of the target image with respect to the reference image and image quality defects (such as whitening or staining).

The image processing apparatus and the image processing method according to the invention can be adapted for various other applications than the printed matter inspection apparatus and the printed matter inspection method. For example, the invention can be applied to a video camera to calculate an amount of blurring on the basis of image collation between frames to thereby provide a blurring correction function. When the invention is applied to a zoom function of a video camera, for example, a specific subject can be zoomed while retained in a frame without photographer's consciousness.

When the invention is applied to an automatic follow-up system using a camera, a follow-up direction can be corrected on the basis of the amount of positional displacement or the rate of scaling up/down of the follow-up subject photographed by the camera. Likewise, when the invention is applied to an automatic focussing system, it can be used for correcting focussing of a subject. When the invention is applied to a personal authentication system, it can be used for checking an image of living body information such as a retina or a fingerprint to thereby construct a reliable authentication system. When the invention is applied to a motion recognition system, it can be used for motion recognition based on image collation between each motion picture frame having a motion picture recorded and a motion picture frame having a specific motion picture recorded. The image processing apparatus and the image processing method according to the invention can be adapted for various applications other than these aforementioned applications.

Figure 29:
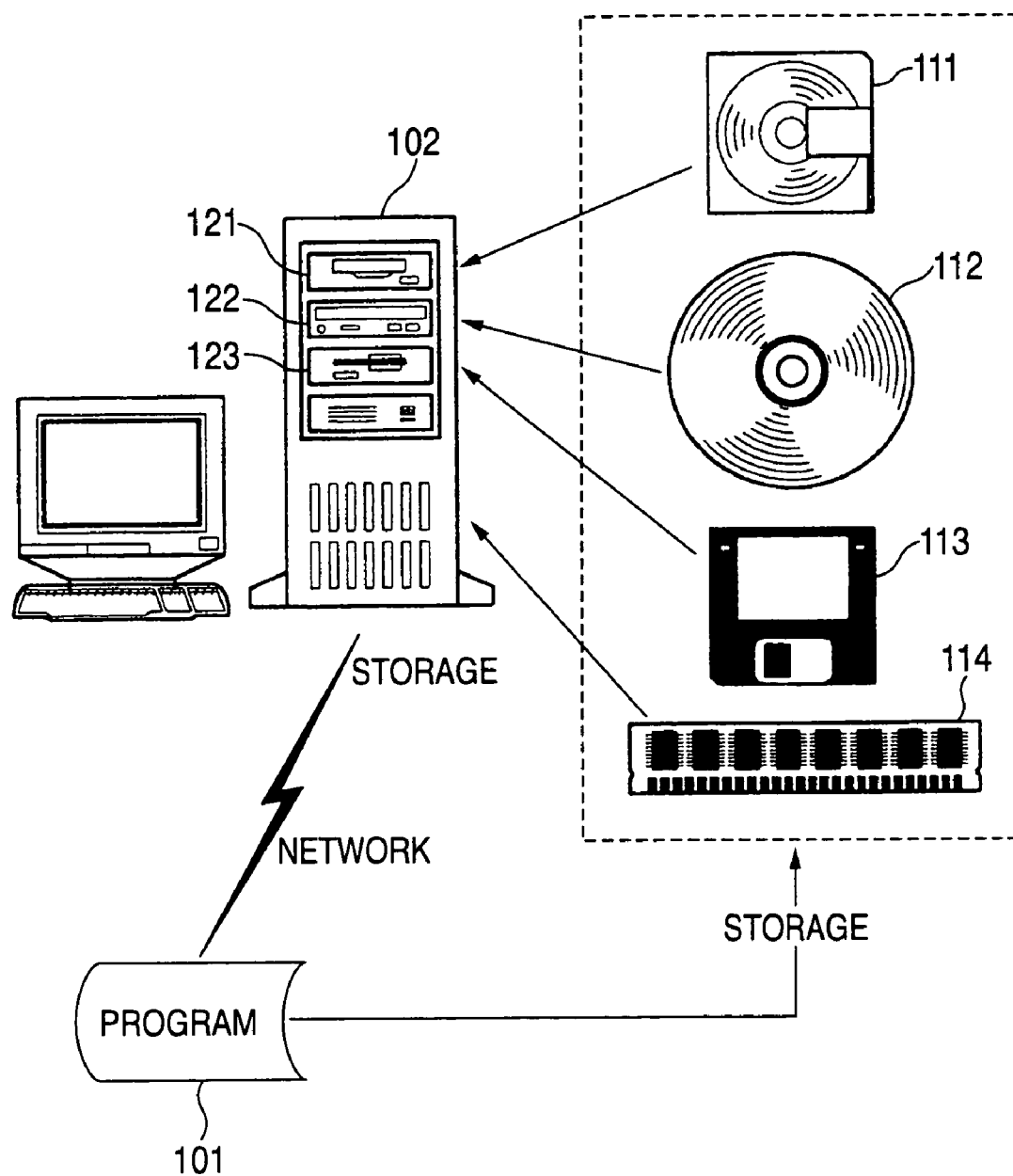
FIG. 29 is a diagram for explaining a computer program and examples of recording media for storing the computer program in the case where the function of the image processing apparatus or the image processing method according to the invention is implemented by the computer program.

FIG. 29 is a diagram for explaining a computer program and examples of storage media for storing the computer program in the case where the function of the image processing apparatus or the image processing method according to the invention is implemented by the computer program. In FIG. 29, the reference numeral 101 designates a program; 102, a computer; 111, an opto-magnetic disk; 112, an optical disk; 113, a magnetic disk; 114, a memory; 121, an opto-magnetic disk device; 122, an optical disk device; and 123, a magnetic disk device.

The function described in the embodiment of the image processing apparatus and the image processing method according to the invention, the function of the image processing portion 53 in the embodiment of the printed matter inspection apparatus and the printed matter inspection method according to the invention, or the like, can be also implemented by the program 101 which can be executed by the computer. In this case, the program 101 and data used in the program can be stored in a recording medium which can be read by the computer. The term "recording medium" means a medium which can generate a state of change in energy such as magnetic energy, optical energy or electric energy to a reader unit provided in hardware resources of the computer in accordance with the descriptive content of the program so that the descriptive content of the program can be transmitted to the reader unit in the format of a signal corresponding to the state of change in energy. Examples of the recording medium include an opto-magnetic disk 111, an optical disk 112 (inclusive of a CD, a DVD or the like), a magnetic disk 113, and a memory 114 (inclusive of an IC card, a memory card, or the like). It is a matter of course that these recording media are not limited to portable media.

The program 101 is stored in any one of these recording media in advance. When, for example, any one of these recording media is mounted in corresponding one of the opto-magnetic disk device 121, the optical disk device 122, the magnetic disk device 123 and a memory slot not shown in the computer 102, the program 101 can be read by the computer for executing the function of the image processing apparatus or the image processing method according to the invention. Or a recording medium may be mounted in the computer 102 in advance. For example, in this case, the program 101 is transferred to the computer 102 through a network or the like and stored in the recording medium before the program 101 is executed by the computer 102. Incidentally, a memory in the computer 102 or the magnetic disk device or another recording medium attached to the computer 102 can be used as the image data storage portion 2. It is matter of course that part of the function of the invention may be constructed by hardware or all of the function may be constructed by hardware.

The program 101 may contain a program for performing processing and controlling peculiar to inspection of printed matter except the function of the image processing apparatus or the image processing method in the embodiment for carrying out the function of the printed matter inspection apparatus or the printed matter inspection method according to the invention. That is, the program 101 may be provided as a printed matter inspection program. The printed matter inspection program may be stored in the memory (e.g., the memory 52 in FIG. 26) of the apparatus in advance. Or the printed matter inspection program may be stored in a recording medium or may be transferred to the computer as the printed matter inspection apparatus through a network and stored in the computer before the printed matter inspection program is executed by the computer. It is a matter of course that these techniques can be used also when the invention is adapted for other applications.

As is obvious from the above description, in accordance with the invention, geometrical distortion appearing in an image as a subject of collation can be corrected. Accordingly, the invention is effective in performing image collation accurately and speedily without influence of image quality defects such as whitening or staining.

[FIG. 1]
 TARGET IMAGE
 REFERENCE IMAGE
 11: PROJECTED WAVEFORM GENERATION PORTION
  21: SPLIT IMAGE GENERATION PORTION
  22: SPLIT PROJECTED WAVEFORM GENERATION PORTION
  23: PROJECTED WAVEFORM SYNTHESIZER PORTION
 12: FEATURE VOLUME EXTRACTION PORTION
 13: FEATURE VOLUME CORRELATION PORTION
 14: CORRECTION VALUE CALCULATION PORTION
 15: LOOKUP TABLE
 16: IMAGE COLLATION PORTION
  COLLATION RESULT

[FIG. 2]
S1a: SPLIT THE IMAGE INTO m×n BLOCKS.
S2a: GENERATE (X- AND Y-DIRECTION) SPLIT PROJECTED WAVEFORMS OF THE SPLIT IMAGES.

S3a: GENERATE (X- AND Y-DIRECTION) SYNTHESIZED PROJECTED WAVEFORMS OF A REQUIRED REGION BY COMBINING THE SPLIT PROJECTED WAVEFORMS.

S4a: GENERATE (X- AND Y-DIRECTION) FEATURE VOLUME DATA OF THE SYNTHESIZED PROJECTED WAVEFORMS.

S1b: SPLIT THE IMAGE INTO in m×n BLOCKS.

S2b: GENERATE (X- AND Y-DIRECTION) SPLIT PROJECTED WAVEFORMS OF THE SPLIT IMAGES.

S3b: GENERATE (X- AND Y-DIRECTION) SYNTHESIZED PROJECTED WAVEFORMS OF A REQUIRED REGION BY COMBINING THE SPLIT PROJECTED WAVEFORMS.

S4b: GENERATE (X- AND Y-DIRECTION) FEATURE VOLUME DATA OF THE SYNTHESIZED PROJECTED WAVEFORMS.

S5: OBTAIN CORRELATION OF DATA ELEMENTS CONTAINED IN EACH FEATURE VOLUME DATA OF THE REFERENCE IMAGE WITH DATA ELEMENTS CONTAINED IN A CORRESPONDING FEATURE VOLUME DATA OF THE TARGET IMAGE BY DP MATCHING (IN EACH OF THE X AND Y DIRECTIONS).

S6: GENERATE A DISTORTION CORRECTING LOOKUP TABLE ON THE BASIS OF THE CORRELATION (IN EACH OF THE X AND Y DIRECTIONS).

S7: GENERATE AN INTERPOLATION LOOKUP TABLE TO BE INTERPOLATED BETWEEN DATA ELEMENTS ON THE LOOKUP TABLE (IN EACH OF THE X AND Y DIRECTIONS).

S8: CORRECT DISTORTION BETWEEN THE REFERENCE IMAGE AND THE TARGET IMAGE ON THE BASIS OF THE INTERPOLATION LOOKUP TABLE AND PERFORM PATTERN MATCHING (IN EACH OF THE X AND Y DIRECTIONS).

[FIG. 26]
31: CLIENT PC
  MEMORY
    REFERENCE IMAGE DATA
32: PRINT SERVER
  MEMORY
    REFERENCE IMAGE DATA
33: IMAGE OUTPUT DEVICE (PRINTER)
  MEMORY
    REFERENCE IMAGE DATA
34: IMAGE READER UNIT
  46: CONTROL PORTION
35: COLLATION UNIT
  51: IMAGE INPUT DEVICE
    MEMORY
      TARGET IMAGE DATA
  52: MEMORY
    REFERENCE IMAGE DATA
  53: IMAGE PROCESSING PORTION

What is claimed is:

1. An image processing apparatus for collating a target image as a subject of inspection with a reference image, comprising:
   a projected waveform generation unit that generates a projected waveform of the reference image and a projected waveform of the target image;
   a feature volume extraction unit that extracts feature volumes from the projected waveform of the reference image and the projected waveform of the target image and generates feature volume data of the reference image and feature volume data of the target image, respectively;
   a feature volume correlation unit that correlates the feature volume data of the target image with the feature volume data of the reference image;
   a correction value calculation unit that calculates correction values in accordance with geometrical distortion between the reference image and the target image based on a result of correlation of the feature volume data of the target image with the feature volume data of the reference image; and
   a collation unit that collates the target image with the reference image by using the correction values.

2. An image processing apparatus according to claim 1, wherein:
   the correction value calculation unit generates an n-dimensional lookup table in which the correction values are stored as data and which is used for correcting the geometrical distortion; and
   the collation unit uses the n-dimensional lookup table for performing collation.

3. An image processing apparatus according to claim 1, wherein:
   the correction value calculation unit generates an n-dimensional lookup table in which the correction values and data interpolated between the correction values are stored and which is used for correcting the geometrical distortion; and
   the collation unit uses the n-dimensional lookup table for performing collation.

4. An image processing apparatus according to claim 1, wherein
   the feature volume correlation unit correlates the feature volume data of the target image with the feature volume data of the reference image using DP matching.

5. An image processing apparatus according to claim 1, wherein
   the feature volume correlation unit correlates respective elements of the feature volume data of the target image with the feature volume data of the reference image successively.

6. An image processing apparatus according to claim 1, wherein
   the projected waveform generation unit includes:
     a split image generation unit that generates split images by splitting an image into m×n blocks;
     a split projected waveform generation unit that generates projected waveforms from the split images; and
     a projected waveform synthesizer unit that generates a projected waveform of the image or a partial image larger in area than one of the split images by combining the projected waveforms generated from one or more of the split images respectively.

7. An image processing apparatus comprising:
   a split image generation unit that generates split images by splitting an image into m×n blocks;
   a split projected waveform generation unit that generates projected waveforms from the split images; and
   a projected waveform synthesizer unit that generates a projected waveform of the image or a partial image larger in area than one of the split images by combining the projected waveforms generated from one or more of the split images respectively; and
   a feature volume extraction unit that extracts feature volumes from the projected waveform of the image and generating feature volume data of the image.

8. An image processing apparatus according to claim 7, comprising:
- an n-dimensional lookup table containing correction values for correcting geometrical distortion in accordance with coordinates; and
- a collation unit that collates a target image with a reference image by using the correction values stored in the n-dimensional lookup table.

9. An image processing method for collating a target image as a subject of inspection with a reference image, wherein a processor performs the method comprising:
- generating a projected waveform of the reference image and a projected waveform of the target image;
- extracting feature volumes from the projected waveform of the reference image and the projected waveform of the target image and generating feature volume data of the reference image and feature volume data of the target image, respectively;
- correlating the feature volume data of the target image with the feature volume data of the reference image;
- calculating correction values in accordance with geometrical distortion between the reference image and the target image based on a result of correlation of the feature volume data of the target image with the feature volume data of the reference image; and
- collating the target image with the reference image by using the correction values.

10. An image processing method according to claim 9, further comprising:
- generating an n-dimensional lookup table in which the correction values are stored as data and which is used for correcting the geometrical distortion; and
- using the n-dimensional lookup table to collate the target image with the reference image.

11. An image processing method according to claim 9, further comprising:
- generating an n-dimensional lookup table on which the correction values and data interpolated between the correction values are held and which is used for correcting the geometrical distortion; and
- using the n-dimensional lookup table to collate the target image with the reference image.

12. An image processing method according to claim 9, wherein
- DP matching is used for correlating the feature volume data of the target image with the feature volume data of the reference image.

13. An image processing method according to claim 9, wherein
- elements of the feature volume data of the target image and the feature volume data of the reference image are collated successively to thereby perform correlation of the feature volume data of the target image with the feature volume data of the reference image.

14. An image processing method according to claim 9, wherein
- the generating the projected waveform of the reference image and the projected waveform of the target image comprises:
  - generating split images by splitting an image into m×n blocks;
  - generating projected waveforms from the split images; and
  - generating a projected waveform of the image or a partial image larger in area than one of the split images by combining the projected waveforms generated from one or more of the split images respectively.

15. An image processing method wherein a processor performs the method comprising:
- generating split images by splitting an image into m×n blocks;
- generating projected waveforms from the split images; and
- generating a projected waveform of the image or a partial image larger in area than one of the split images by combining the projected waveforms generated from one or more of the split images respectively; and
- extracting feature volumes from the projected waveform of the image and generating feature volume data of the image.

16. An image processing method according to claim 15, comprising:
- generating an n-dimensional lookup table containing correction values for correcting geometrical distortion in accordance with coordinates; and
- collating a target image with a reference image by using the correction values contained in the n-dimensional lookup table.

17. A computer-readable medium storing a computer program for collating a target image as a subject of inspection with a reference image, the computer program comprising:
- generating a projected waveform of the reference image and a projected waveform of the target image;
- extracting feature volumes from the projected waveform of the reference image and the projected waveform of the target image and generating feature volume data of the reference image and feature volume data of the target image, respectively;
- correlating the feature volume data of the target image with the feature volume data of the reference image;
- calculating correction values in accordance with geometrical distortion between the reference image and the target image based on a result of correlation of the feature volume data of the target image with the feature volume data of the reference image; and
- collating the target image with the reference image by using the correction values.

18. A computer-readable medium storing a computer program according to claim 17, wherein:
- the calculating correction values generates an n-dimensional lookup table in which the correction values are stored as data and which is used for correcting the geometrical distortion; and
- the collating the target image with the reference image uses the n-dimensional lookup table for performing collation.

19. A computer-readable medium storing a computer program according to claim 17, wherein:
- the calculating the correction values generates an n-dimensional lookup table in which the correction values and data interpolated between the correction values are stored and which is used for correcting the geometrical distortion; and
- the collating the target image with the reference image uses the n-dimensional lookup table for performing collation.

20. A computer-readable medium storing a computer program according to claim 17, wherein
- the correlating the feature volume data correlates the feature volume data of the target image with the feature volume data of the reference image using DP matching.

21. A computer-readable medium storing a computer program according to claim 17, wherein
- the correlating the feature volume data of the target image with the feature volume data of the reference image correlates respective elements of the feature volume data of the target image with the feature volume data of the reference image successively.

22. A computer-readable medium storing a computer program according to claim 17, wherein
the generating the projected waveform of the reference image and the projected waveform of the target image comprises:
generating split images by splitting an image into m×n blocks;
generating projected waveforms from the split images; and
generating a projected waveform of the image or a partial image larger in area than one of the split images by combining the projected waveforms generated from one or more of the split images respectively, so as to generate the projected waveform of the reference image and the projected waveform of the target image respectively.

23. A computer-readable medium storing a computer program, the computer program comprising:
generating split images by splitting an image into m×n blocks;
generating projected waveforms from the split images; and
generating a projected waveform of the image or a partial image larger in area than one of the split images by combining the projected waveforms generated from one or more of the split images respectively; and
extracting feature volumes from the projected waveform of the image and generating feature volume data of the image.

24. A computer-readable medium storing a computer program according to claim 23, the computer program comprising:
generating an n-dimensional lookup table containing correction values for correcting geometrical distortion in accordance with coordinates; and
collating a target image with a reference image by using the correction values contained in the n-dimensional lookup table.

25. A printed matter inspection apparatus for inspecting printed matter, comprising:
a reference image storage unit that stores a reference image used for forming the printed matter;
an image reader unit that reads an image of the printed matter as a target image which is a subject of inspection;
a projected waveform generation unit that generates a projected waveform of the reference image and a projected waveform of the target image;
a feature volume extraction unit that extracts feature volumes from the projected waveform of the reference image and the projected waveform of the target image and generates feature volume data of the reference image and feature volume data of the target image, respectively;
a feature volume correlation unit that correlates the feature volume data of the target image with the feature volume data of the reference image;
a correction value calculation unit that calculates correction values in accordance with geometrical distortion between the reference image and the target image based on a result of correlation of the feature volume data of the target image with the feature volume data of the reference image; and
a collation unit that collates the target image with the reference image by using the correction values.

26. A printed matter inspection method for inspecting printed matter, wherein a processor performs the method comprising:
reading an image of the printed matter as a target image which is a subject of inspection;
generating a projected waveform of a reference image and a projected waveform of the target image;
extracting feature volumes from the projected waveform of the reference image and the projected waveform of the target image and generating feature volume data of the reference image and feature volume data of the target image, respectively;
correlating the feature volume data of the target image with the feature volume data of the reference image;
calculating correction values in accordance with geometrical distortion between the reference image and the target image based on a result of correlation of the feature volume data of the target image with the feature volume data of the reference image; and
collating the target image with the reference image by using the correction values.

27. A computer-readable medium storing a computer program for inspecting printed matter, the computer program comprising:
reading an image of the printed matter as a target image which is a subject of inspection;
storing an image used for forming the printed matter as a reference image;
generating a projected waveform of the reference image and a projected waveform of the target image;
extracting feature volumes from the projected waveform of the reference image and the projected waveform of the target image and generating feature volume data of the reference image and feature volume data of the target image, respectively;
correlating the feature volume data of the target image with the feature volume data of the reference image;
calculating correction values in accordance with geometrical distortion between the reference image and the target image based on a result of correlation of the feature volume data of the target image with the feature volume data of the reference image; and
collating the target image with the reference image by using the correction values.

* * * * *